(12) United States Patent
Sasaki et al.

(10) Patent No.: US 7,721,415 B2
(45) Date of Patent: May 25, 2010

(54) METHOD OF MANUFACTURING A THIN-FILM MAGNETIC HEAD

(75) Inventors: Yoshitaka Sasaki, Santa Clara, CA (US); Hiroyuki Ito, Milpitas, CA (US); Takehiro Horinaka, Milpitas, CA (US); Takehiro Kamigama, Shatin (HK); Tatsushi Shimizu, Shatin (HK)

(73) Assignees: Headway Technologies, Inc, Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 834 days.

(21) Appl. No.: 11/406,268

(22) Filed: Apr. 19, 2006

(65) Prior Publication Data

US 2008/0002293 A1  Jan. 3, 2008

(51) Int. Cl.
*G11B 5/127* (2006.01)
*H04R 31/00* (2006.01)

(52) U.S. Cl. .............. 29/603.16; 29/603.07; 29/603.13; 29/603.15; 29/603.18; 205/119; 205/122; 360/121; 360/122; 360/317; 451/5; 451/41

(58) Field of Classification Search .............. 29/603.07, 29/603.13–603.16, 603.18, 605, 606; 205/119, 205/122; 360/121, 122, 317; 427/127, 128; 451/5, 41

See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 7,296,337 B2 * | 11/2007 | McFadyen | 29/603.16 |
| 7,468,863 B2 * | 12/2008 | Sasaki et al. | 360/125.09 |
| 7,468,864 B2 * | 12/2008 | Sasaki et al. | 360/125.12 |
| 7,492,555 B2 * | 2/2009 | Sasaki et al. | 360/317 |

FOREIGN PATENT DOCUMENTS

| | | |
|---|---|---|
| JP | A 2003-203311 | 7/2003 |
| JP | A 2003-242607 | 8/2003 |
| JP | A 2004-94997 | 3/2004 |

* cited by examiner

*Primary Examiner*—Paul D Kim
(74) *Attorney, Agent, or Firm*—Oliff & Berridge PLC

(57) ABSTRACT

A thin-film magnetic head is manufactured as follows. First, a base insulating layer having a magnetic pole forming depression sunken into a form corresponding to the main magnetic pole layer is formed, a stop film for CMP is formed such as to fill the magnetic pole forming depression, and then a magnetic layer is formed on the stop film. Next, the magnetic layer is separated by forming a separation groove substantially surrounding the magnetic pole forming depression on the outside thereof, and thus separated magnetic layer is formed with a cover insulating film adapted to cover the whole upper face. The surface is polished by CMP until the stop film is exposed, so that the part of magnetic layer remaining on the inside of the magnetic pole forming depression is used as the main magnetic pole layer. Further, a recording gap layer, a write shield layer, and a thin-film coil are formed.

12 Claims, 22 Drawing Sheets

*Fig.13*
(A)
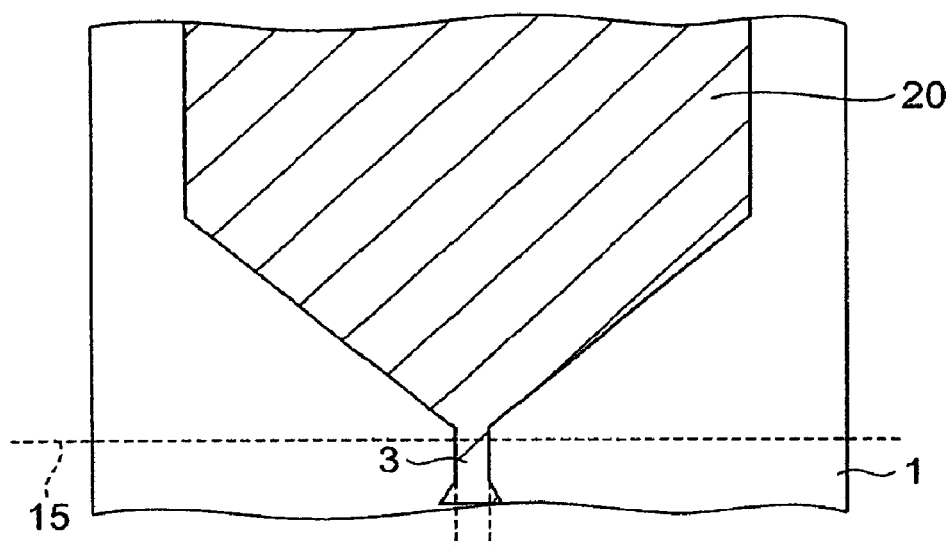
(B)
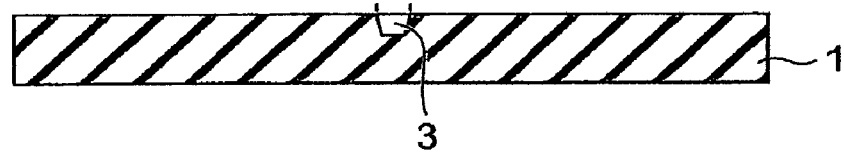
(C)
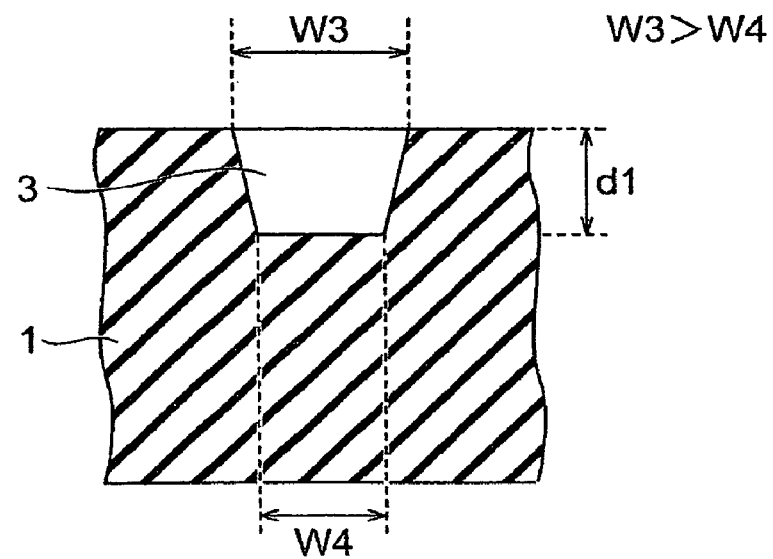
W3 > W4

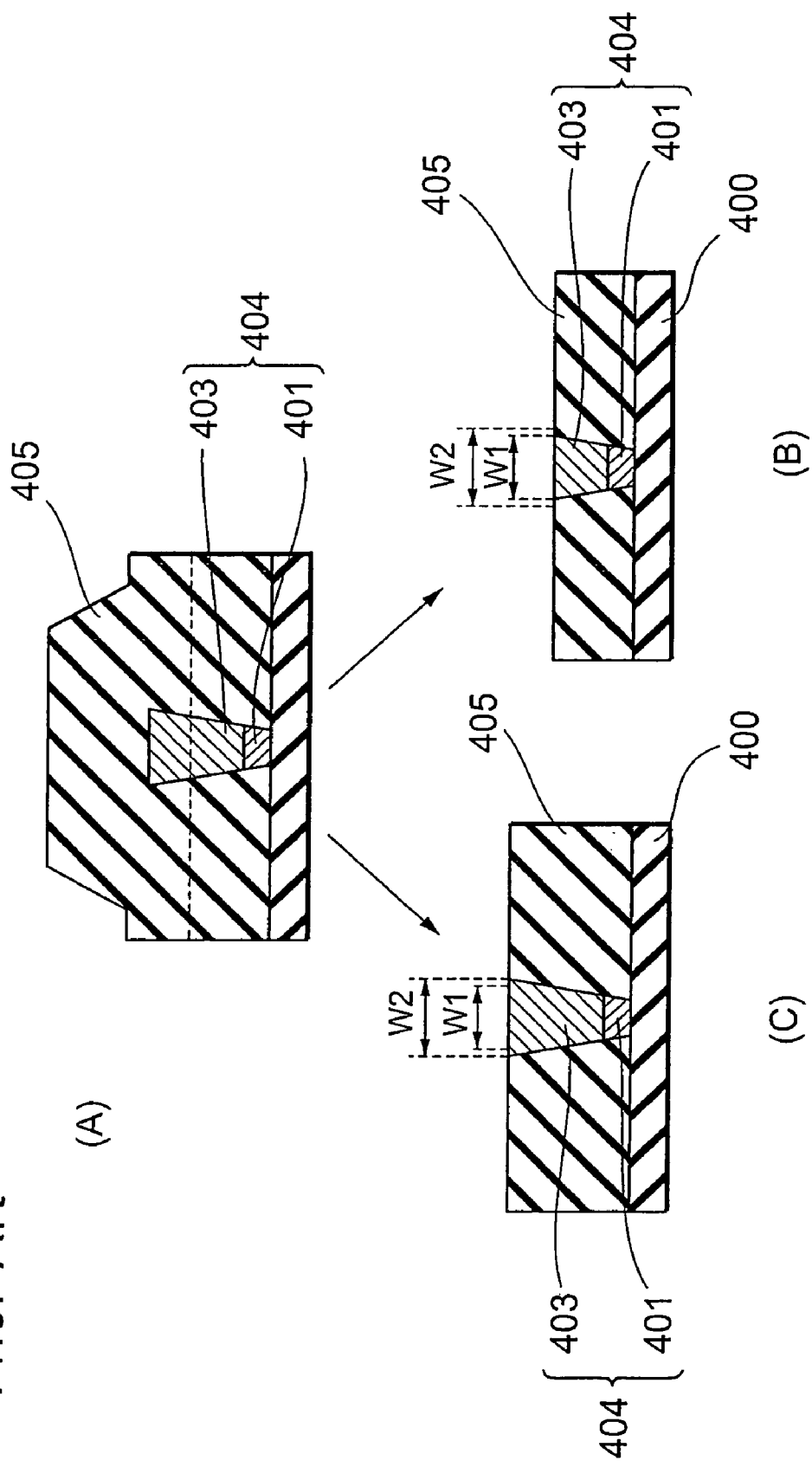

METHOD OF MANUFACTURING A THIN-FILM MAGNETIC HEAD

BACKGROUND OF THE INVENTION

1. Field of the Invention

The present invention relates to a thin-film magnetic head which performs magnetic recording operations by perpendicular recording schemes, a method of manufacturing the same, a head gimbal assembly and hard disk drive.

2. Related Background Art

In recent years, the areal density in hard disk drives has been increasing remarkably. Recently, the areal density in hard disk drives has reached 160 to 200 GB/platter in particular, and is about to increase further. Accordingly, thin-film magnetic heads have been required to improve their performances.

In terms of recording schemes, thin-film magnetic heads can roughly be divided into those for longitudinal recording in which information is recorded in a (longitudinal) direction of a recording surface of a hard disk (recording medium) and those for perpendicular recording in which data is recorded while the direction of recording magnetization formed in the hard disk is perpendicular to the recording surface. As compared with the thin-film magnetic heads for longitudinal recording, the thin-film magnetic heads for perpendicular recording have been considered more hopeful, since they can realize a much higher recording density while their recorded hard disks are less susceptible to thermal fluctuations.

Conventional thin-film magnetic heads for perpendicular recording are disclosed, for example, in U.S. Pat. No. 6,504,675, U.S. Pat. No. 4,656,546, U.S. Pat. No. 4,672,493, and Japanese Patent Application Laid-Open No. 2004-94997.

Meanwhile, when thin-film magnetic heads for perpendicular recording record data onto areas in inner and outer peripheries of a hard disk, a magnetic pole end part disposed on the side of a medium-opposing surface (also referred to as air bearing surface, ABS) opposing the recording medium (hard disk) yields a certain skew angle with respect to a data recording track. In perpendicular magnetic recording heads (hereinafter also referred to as "PMR") having a high writing capability, the skew angle has caused a problem of so-called side fringe in which unnecessary data are recorded between adjacent tracks. The side fringe adversely affects the detection of servo signals and the S/N ratio of reproduced waveforms. Therefore, in conventional PMRs, the magnetic pole end part on the ABS side in the main magnetic pole layer has a bevel form gradually narrowing in width toward one direction (see, for example, Japanese Patent Application Laid-Open Nos. 2003-242607 and 2003-203311 in this regard).

Since it is necessary to move the magnetic head when writing data onto a recording medium, eliminate the above-mentioned problem of side fringe and the problem of erasing data in adjacent tracks, and so forth, the bevel angle (θ shown in FIG. 19) in conventional PMRs has been set within the range of 5 to 12 degrees.

Such a PMR has been formed as follows, for example. A method of manufacturing a conventional PMR will now be explained with reference to FIGS. 18 to 21. First, as shown in FIG. 18, a seed layer 401 is formed on an insulating layer 400 made of alumina or the like. Next, a resist pattern 402 provided with a tapered depression corresponding to a bevel angle is selectively formed, and a magnetic layer 403 is formed by plating with a magnetic material such as FeNi, CoNiFe, or CoFe so as to fill the tapered depression. Subsequently, the resist pattern 402 is removed, and the seed layer 401 is etched by ion beam etching (hereinafter referred to as "IBE"), whereby a main magnetic pole layer having a magnetic pole end part 404 is formed as shown in FIG. 19.

OBJECT AND SUMMARY OF THE INVENTION

Since the magnetic pole end part 404 is formed into a bevel form as mentioned above, the track width varies depending on the height and bevel angle of the magnetic pole end part 404 in the conventional PMRs. Therefore, the height and width of the magnetic pole end part 404 have been determined by chemical mechanical polishing (hereinafter referred to as "CMP") and photolithography, respectively, so as to yield an assumed track width, which makes it necessary for the magnetic pole end part 404 to adjust its height and width to appropriate values.

In the conventional technique, however, the thickness of the magnetic layer 403 has varied within a wafer, thereby making the height of the magnetic pole end part 404 in each main magnetic pole layer within the wafer variable and uneven. This makes it necessary to polish the whole wafer such that the magnetic pole end part 404 has a uniform height. A procedure therefor is as follows, for example.

First, as shown in FIG. 20, selective wet etching is performed, so as to remove the magnetic layer 403 and seed layer 401 from field areas f arranged on both sides of the magnetic pole end part 404. Next, an aluminum film 405 is formed by a thickness of about 0.35 µm. Then, a Ta film 406 as a stopper for CMP is formed by a thickness of 400 to 600 Å on both sides of the magnetic pole end part 404. Thereafter, an aluminum film 407 is formed by a thickness of about 6000 Å.

Next, the aluminum film 407 is polished by CMP until the Ta film 406 acting as the stopper is exposed. However, there have been cases where the polishing advances so much that the height of the magnetic pole end part 404 and its surroundings is lower by about 1500 Å than the Ta film 406 as shown in FIG. 21, since the aluminum film 405 fails to have a favorable evenness in its thickness. Such a drop in thickness is formed by over-polish of CMP. However, it becomes difficult to adjust the drop in height when the Ta film 406 is distanced from the magnetic pole end part 404 so that the interval between the Ta films 406 is large.

Therefore, when a polishing by CMP is performed from the state shown in FIG. 22(A) in the conventional PMRs, the height of the magnetic pole end part 404 may become shorter than the assumed height because of over-polish as shown in FIG. 22(B) or, on the contrary, higher than the assumed height because of shortage in polishing as shown in FIG. 22(C), thus making the magnetic pole end part 404 more likely to fluctuate its height. As a consequence, the width of the magnetic pole end part 404 may become W1 (in the case of FIG. 22(B)) or W2 (in the case of FIG. 22(C)), thereby generating fluctuations. As shown in FIGS. 22(B) and (C), the higher the magnetic pole end part 404 is, the wider the magnetic pole end part 404 becomes, thereby increasing the track width; the lower the magnetic pole end part 404 is, the narrower the magnetic pole end part 404 becomes, thereby reducing the track width.

As in the foregoing, the conventional techniques have been problematic in that the magnetic pole end part 404 is likely to fluctuate its height even when polished by CMP in order for the magnetic pole end part 404 to attain a uniform height. When the height of the magnetic pole end part 404 fluctuates, the width of the magnetic pole end part 404 varies, whereby the track width fluctuates as well. Therefore, the conventional PMRs have been problematic in that they are hard to form the magnetic pole end part 404 with a uniform size so as not to generate fluctuations, whereby their yield is very low.

The following manufacturing method may be considered, for example, for eliminating the unevenness in size of the magnetic pole end part mentioned above. This is a manufacturing method in which an insulating layer is formed with a depression conforming to the size of the main magnetic pole layer before forming a magnetic layer, and the magnetic layer is formed by plating over the whole upper face of the insulating layer such that a magnetic material fills the depression.

When forming a PMR by this manufacturing method, however, an unnecessary surplus magnetic layer is also formed on the outside of the depression and must be removed by CMP or the like. The magnetic layer remains on the whole upper face of the insulating layer when performing CMP, whereby the area of the magnetic layer to be subjected to CMP is large. Therefore, the rate at which the magnetic layer is removed by CMP is so slow that the amount of polishing is hard to adjust finely, which makes it nearly impossible to remove the surplus magnetic layer uniformly. Consequently, the amount of polishing may vary among the PMRs formed on the wafer, whereby it has been impossible for the magnetic pole end part to achieve a uniformity in size. Hence, even this manufacturing method has failed to achieve the task of forming the magnetic pole end part in conformity to the assumed uniform size without generating fluctuations.

For achieving the above-mentioned task, it is an object of the present invention to provide a thin-film magnetic head for performing a magnetic recording operation by a perpendicular recording scheme, a method of manufacturing the same, a head gimbal assembly, and a hard disk drive, in which a main magnetic pole layer is formed with a uniform size without generating fluctuations, thus attaining a favorable yield.

For attaining the above-mentioned object, in one aspect, the present invention provides a thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer is incorporated in a magnetic pole forming depression of a base insulating layer, the magnetic pole forming depression being sunken into a form corresponding to the main magnetic pole layer; and wherein the thin-film magnetic head has a remnant insulating film, formed on the outside of the magnetic pole forming depression so as to substantially surround the magnetic pole forming depression, covering the base insulating layer.

A remnant coating made of Ta, Ru, W, Ti, Cr, NiCr, or the like may be formed in a part between the magnetic pole forming depression and remnant insulating film on a surface of the base insulating layer.

In another aspect, the present invention provides a thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer is incorporated in a magnetic pole forming depression of a base insulating layer, the magnetic pole forming depression being sunken into a form corresponding to the main magnetic pole layer; wherein the thin-film magnetic head has a remnant insulating film, formed on the outside of the magnetic pole forming depression so as to substantially surround the magnetic pole forming depression, covering the base insulating layer, whereas a surface of the remnant insulating film and a surface of the main magnetic pole layer are formed flat without a step; and wherein the recording gap layer is formed on the surface of the remnant insulating film and the surface of the main magnetic pole layer.

A remnant coating made of Ta, Ru, W, Ti, Cr, NiCr, or the like may be formed in a part between the magnetic pole forming depression and remnant insulating film on a surface of the base insulating layer, and the recording gap layer may be formed on the remnant coating in this thin-film magnetic head as well.

Preferably, an outer peripheral distance indicating a gap between the magnetic pole forming depression and the remnant insulating film is set within the range of 10 to 1000 μm.

In still another aspect, the present invention provides a method of manufacturing a thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated, the method comprising the steps of forming a base insulating layer having a magnetic pole forming depression sunken into a form corresponding to the main magnetic pole layer; forming a stop film for CMP on the base insulating layer such that the stop film enters the magnetic pole forming depression and then forming a magnetic layer on the stop film; separating the magnetic layer by forming a separation groove substantially surrounding the magnetic pole forming depression on the outside thereof; forming a cover insulating film adapted to cover the whole upper face of the magnetic layer separated by the separation groove; polishing a surface by CMP until the stop film is exposed, so that a part of the magnetic layer remaining on the inside of the magnetic pole forming depression is used as the main magnetic pole layer; and forming the recording gap layer, write shield layer, and thin-film coil.

This manufacturing method separates the magnetic layer by forming a separation groove before polishing the magnetic layer by CMP.

In still another aspect, the present invention provides a method of manufacturing a thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated, the method comprising the steps of forming a base insulating layer having a magnetic pole forming depression sunken into a form corresponding to the main magnetic pole layer; forming a stop film for CMP on the base insulating layer such that the stop film enters the magnetic pole forming depression and then forming a magnetic layer on the stop film; forming a separation groove substantially surrounding the magnetic pole forming depression on the outside thereof, so that, of the magnetic layer separated by the separation groove, a part on the inside of the separation groove is used as a remnant magnetic layer while a part on the outside of the separation groove is used as an outer magnetic layer; removing the outer magnetic layer, so as to leave the remnant magnetic layer; forming a cover insulating film adapted to cover the whole upper face including the remnant magnetic layer and separation groove; polishing a surface by CMP until the stop film is exposed, so that a part of the magnetic layer remaining on the inside of the magnetic pole forming depression is used as the main magnetic pole layer; and forming the recording gap layer, write shield layer, and thin-film coil.

This manufacturing method separates the magnetic layer by forming a separation groove before polishing the magnetic layer by CMP, and removes the part of thus separated magnetic layer on the outside of the separation groove.

When the part of remnant magnetic layer remaining on the inside of the magnetic pole forming depression is used as the main magnetic pole layer in this manufacturing method, the part of cover insulating film remaining on the inside of the separation groove may be used as a remnant insulating film.

When the part of magnetic layer remaining on the inside of the magnetic pole forming depression is used as the main magnetic pole layer in this manufacturing method, a height of the main magnetic pole layer may be finely adjusted by IBE, so as to remove the stop film.

In the step of removing the outer magnetic layer, so as to leave the remnant magnetic layer, the stop film may be left.

Preferably, the separation groove is formed such that an outer peripheral distance indicating a gap between the magnetic pole forming depression and the remnant insulating film is set within the range of 10 to 1000 μm.

More preferably, the separation groove is formed such that an outer peripheral distance indicating a gap between the magnetic pole forming depression and the remnant insulating film is set within the range of 15 to 200 μm.

The separation groove may be formed such that a width of the separation groove falls within the range of 5 to 20 μm.

In still another aspect, the present invention provides a head gimbal assembly comprising a support, a thin-film magnetic head formed on the support, and a gimbal securing the support; the thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer is incorporated in a magnetic pole forming depression of a base insulating layer, the magnetic pole forming depression being sunken into a form corresponding to the main magnetic pole layer; wherein the thin-film magnetic head has a remnant insulating film, formed on the outside of the magnetic pole forming depression so as to substantially surround the magnetic pole forming depression, covering the base insulating layer, whereas a surface of the remnant insulating film and a surface of the main magnetic pole layer are formed flat without a step; and wherein the recording gap layer is formed on the surface of the remnant insulating film and the surface of the main magnetic pole layer.

In still another aspect, the present invention provides a hard disk drive comprising a head gimbal assembly having a thin-film magnetic head and a recording medium opposing the thin-film magnetic head; the thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer is incorporated in a magnetic pole forming depression of a base insulating layer, the magnetic pole forming depression being sunken into a form corresponding to the main magnetic pole layer; wherein the thin-film magnetic head has a remnant insulating film, formed on the outside of the magnetic pole forming depression so as to substantially surround the magnetic pole forming depression, covering the base insulating layer, whereas a surface of the remnant insulating film and a surface of the main magnetic pole layer are formed flat without a step; and wherein the recording gap layer is formed on the surface of the remnant insulating film and the surface of the main magnetic pole layer.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 13 is a view enlarging a main part of FIG. 12 with changed ratios of dimensions, in which (A) is a plan view, (B) is a sectional view assuming a state cut at the ABS 15 in (A), and (C) is a sectional view enlarging a main part in (B);

FIG. 22 is a sectional view showing a procedure of making the magnetic pole end part attain a uniform height while assuming the state of being cut at the ABS, in which (A), (B), and (C) show respective cases prior to CMP, where CMP advances too much, and where CMP is in short.

DETAILED DESCRIPTION OF THE PREFERRED EMBODIMENTS

In the following, embodiments of the present invention will be explained with reference to the drawings. Constituents identical to each other will be referred to with numerals identical to each other without repeating their overlapping descriptions.

Method of Manufacturing a Thin-Film Magnetic Head

With reference to FIGS. 1 to 16, a method of manufacturing a thin-film magnetic head in accordance with the present invention will be explained.

The thin-film magnetic head manufactured by the method of manufacturing a thin-film magnetic head in accordance with the present invention encompasses a type (type 1) in which a thin-film coil is wound about a main magnetic pole layer and a type (type 2) in which the thin-film coil is wound about a write shield layer. The following explanation will set forth a method of manufacturing a thin-film magnetic head 300 of the former type (type 1) shown in FIG. 1 by way of example.

Figure 1:
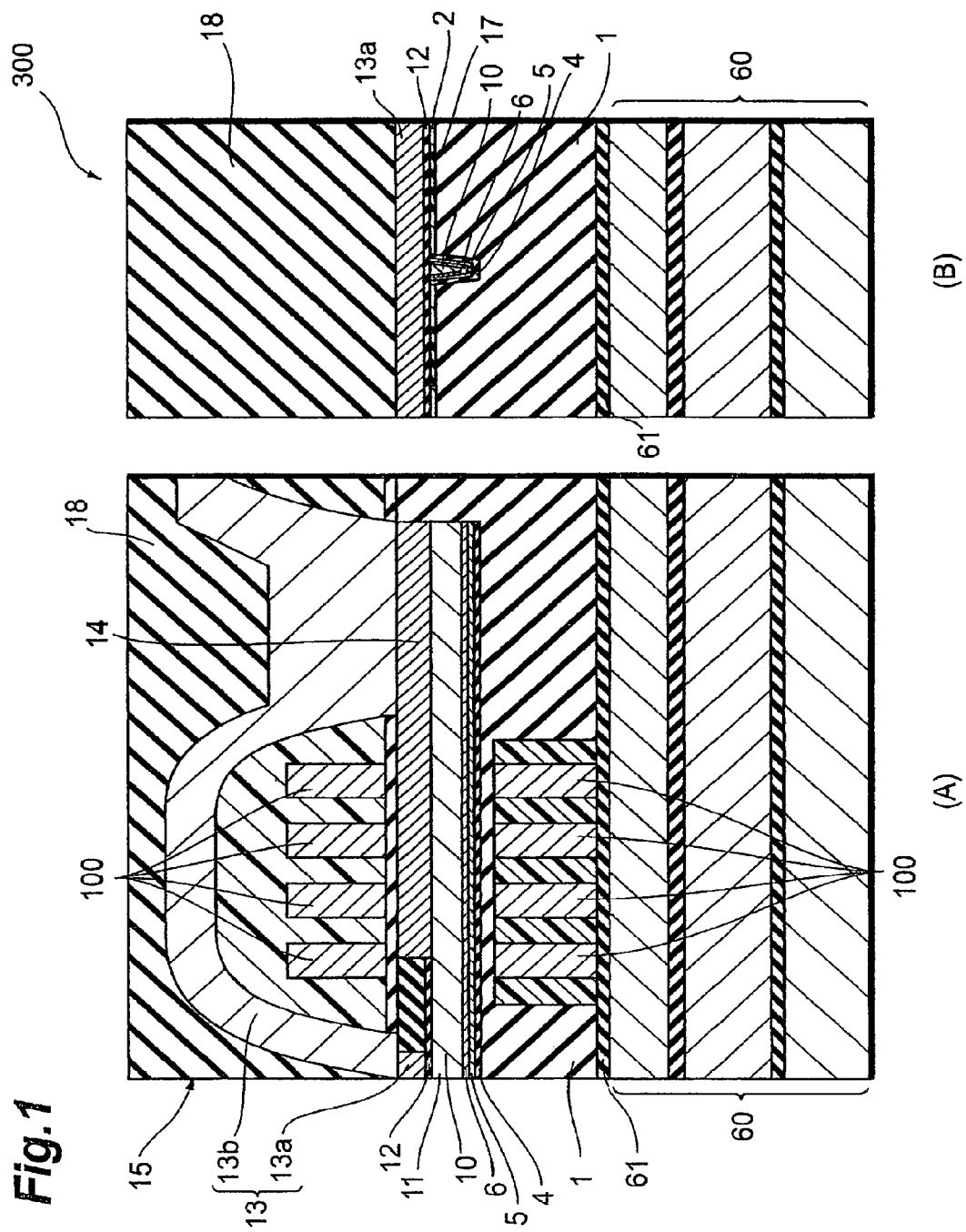
FIG. 1 is a sectional view of the thin-film magnetic head in accordance with an embodiment of the present invention taken along a direction intersecting a thin-film coil.
Figure 2:
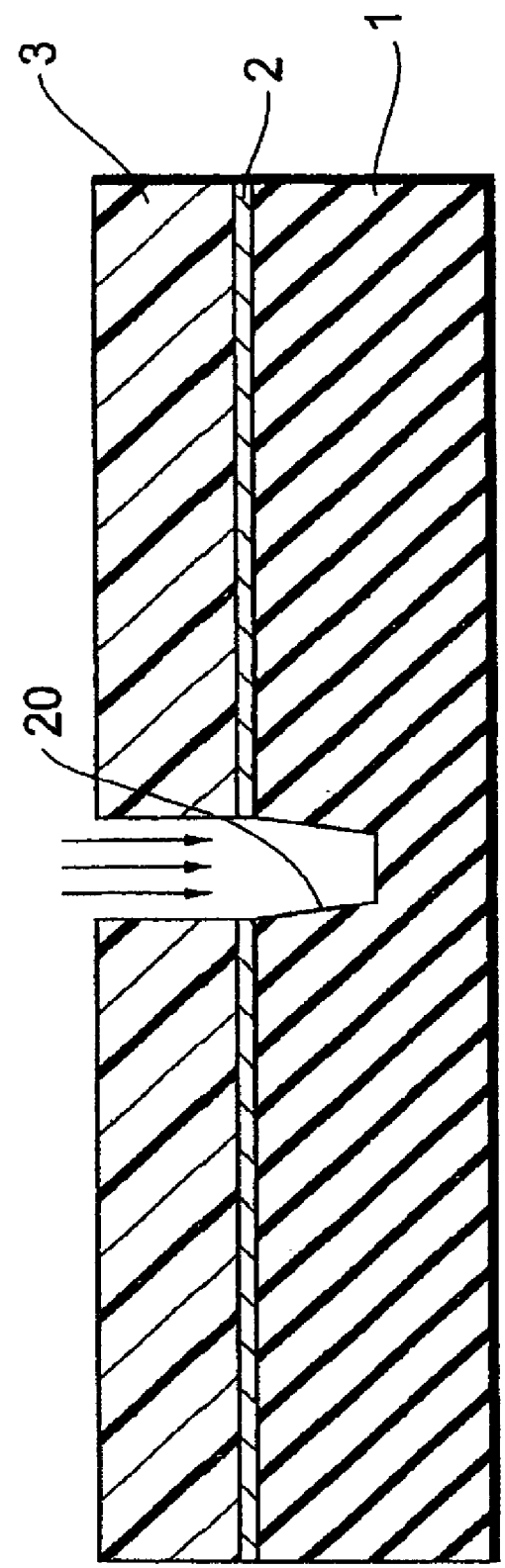
FIG. 2 is a sectional view assuming a state where the thin-film magnetic head in accordance with the embodiment of the present invention is cut at an ABS during the course of its manufacture.

As shown in FIG. 1, the thin-film magnetic head 300 has a structure in which a main magnetic pole layer 10 including a magnetic pole end part 11 on a side of an ABS 15 as a medium-opposing surface opposing a recording medium, a write shield layer 13 opposing the magnetic pole end part 11 so as to form a recording gap layer 12 on the ABS 15 side, and a thin-film coil 100 wound about the main magnetic pole layer 10 and an upper magnetic pole layer 14 connected to the upper side of the main magnetic pole layer 10 are laminated.

When manufacturing the thin-film magnetic head 300 by the manufacturing method in accordance with the present invention, a laminated layer structure 60 comprising a reproducing head such as MR device (magnetoresistive device) and a plurality of shied layers and the like (see FIG. 1) are formed on an undepicted substrate made of aluminum oxide-titanium carbide ($Al_2O_3$.TiC), for example. An insulating layer 61 made of alumina is formed thereon, and the part of thin-film coil 100 under the main magnetic pole layer 10 is formed on the upper side of the insulating layer 61. Next, an insulating layer 1 is formed from alumina ($Al_2O_3$) or a non-magnetic material. FIGS. 2 to 9 show steps after forming the insulating layer 1. FIGS. 2 to 9 omit the construction (such as the laminated layer structure 60) on the lower side of the insulating layer 1.

Figure 10:
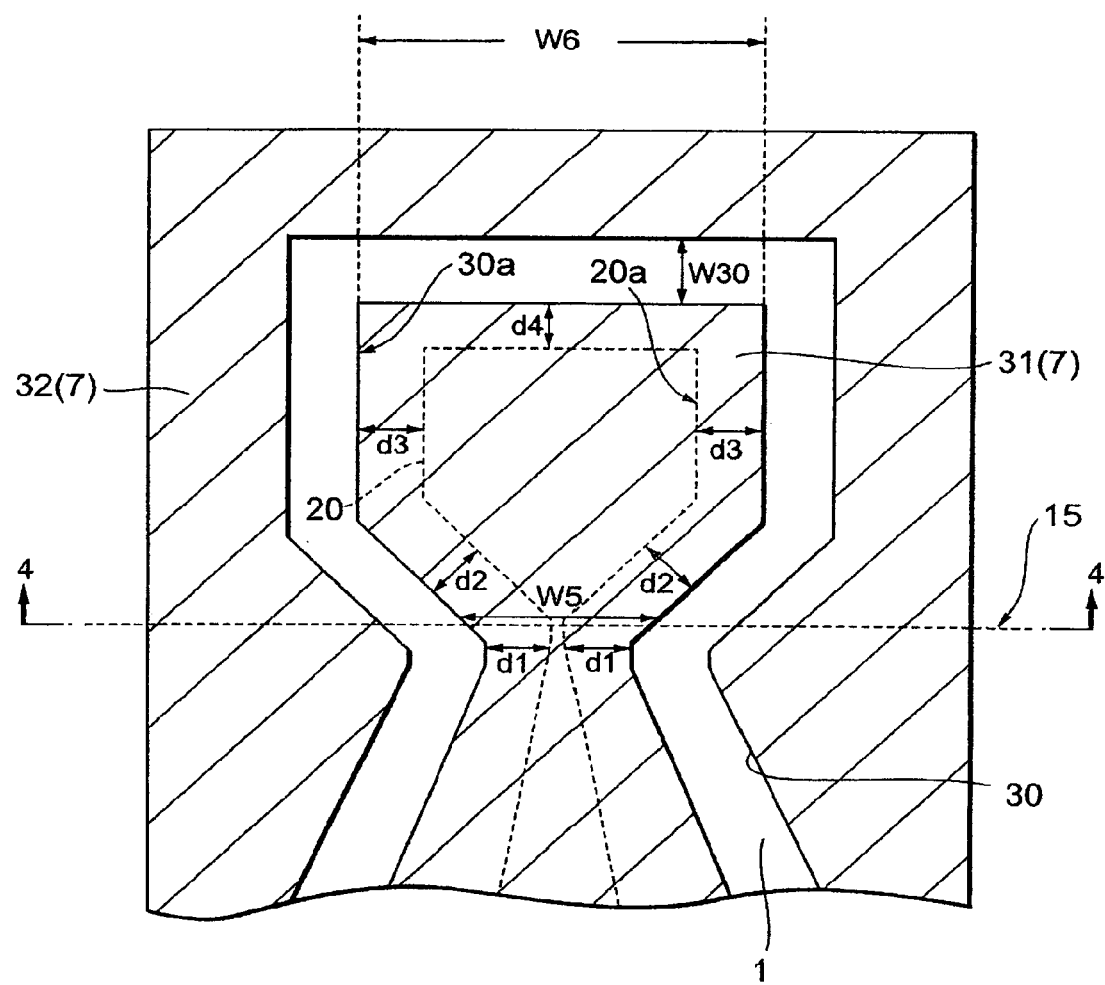
FIG. 10 is a plan view corresponding to FIG. 4.
Figure 11:
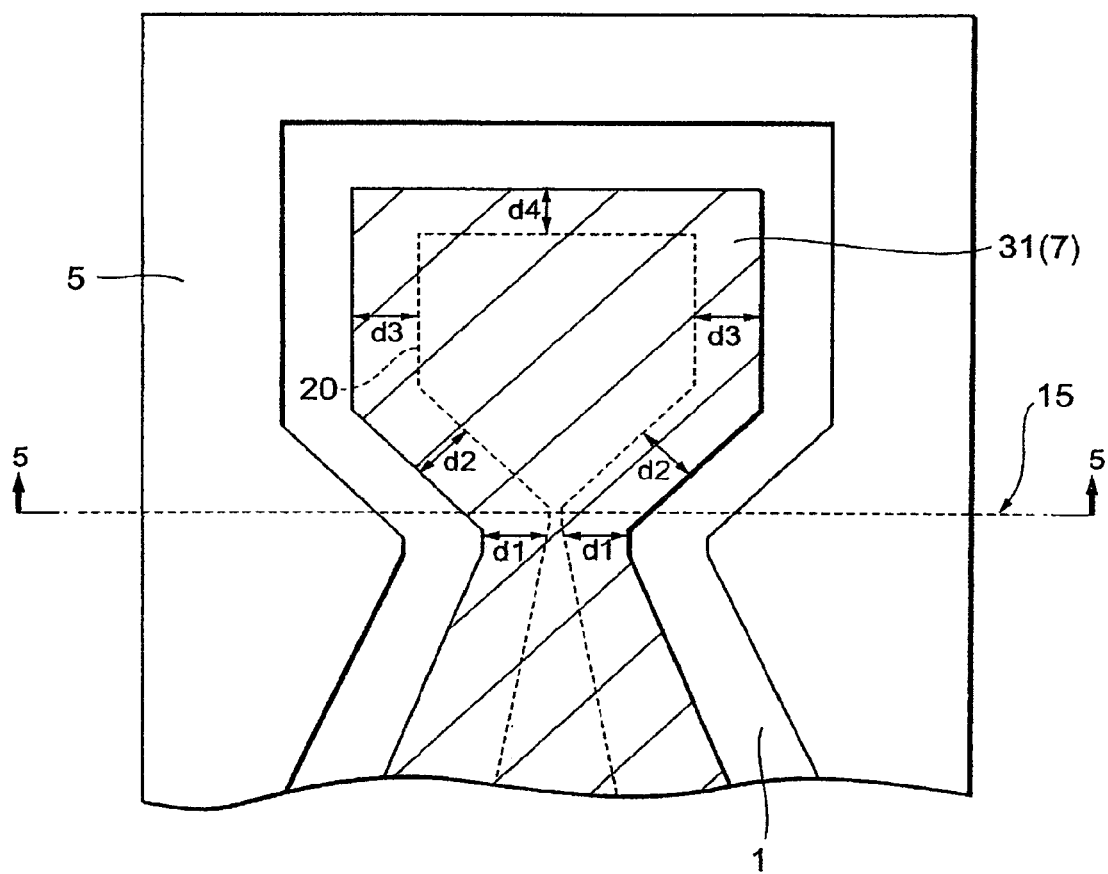
FIG. 11 is a plan view corresponding to FIG. 5.
Figure 12:
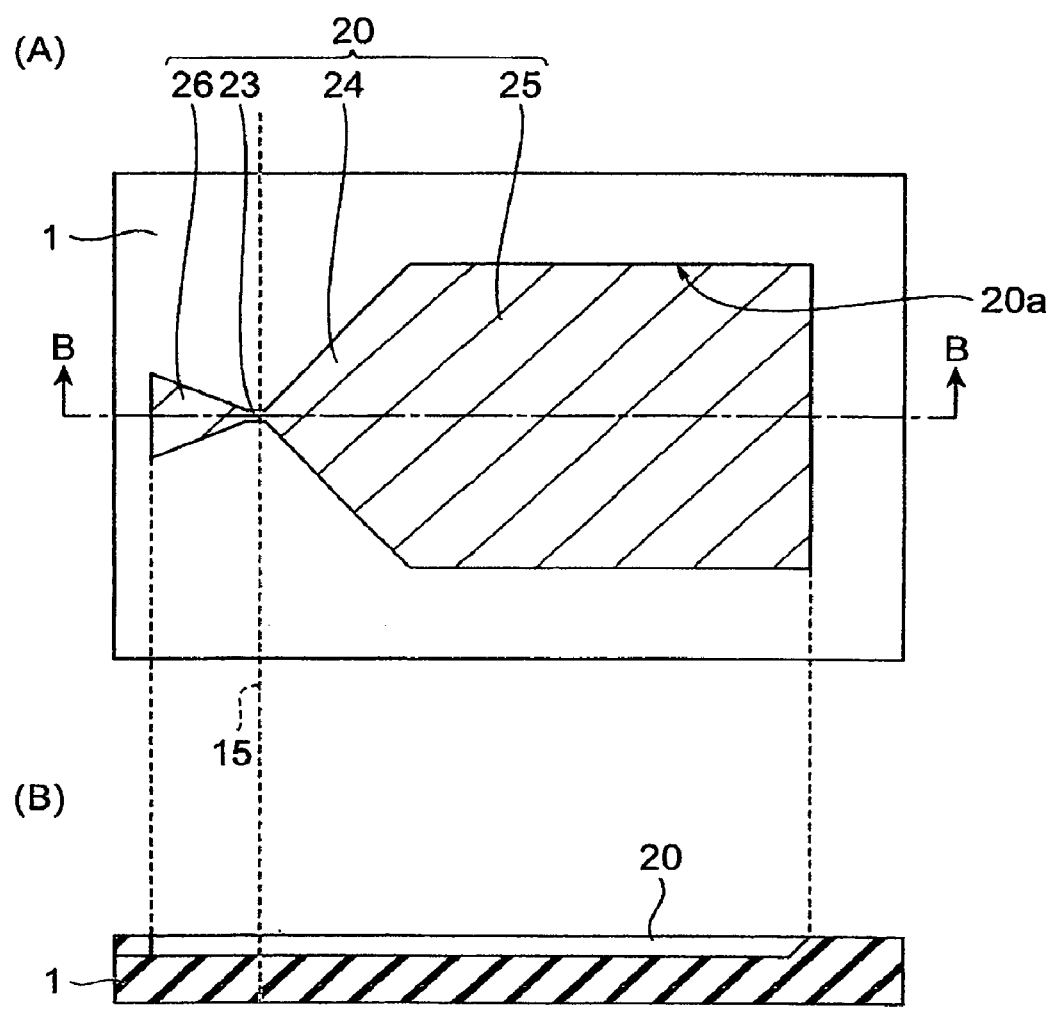
FIG. 12 is a view showing an insulating layer corresponding to FIG. 2, in which (A) is a plan view, whereas (B) is a sectional view taken along the line B-B of (A)
Figure 14:
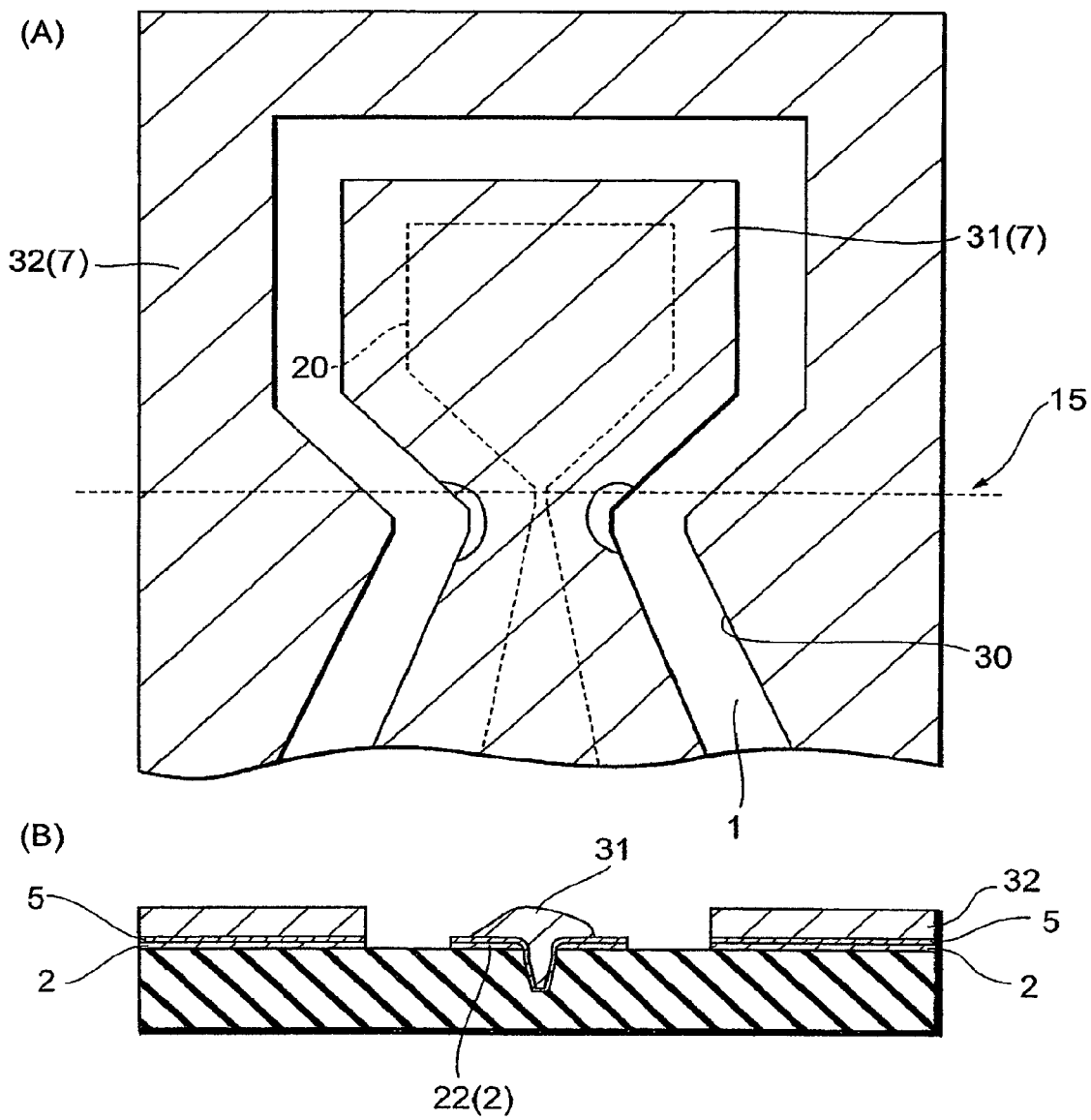
FIG. 14 is a view showing a process of manufacturing a thin-film magnetic head while shortening the outer peripheral distance, in which (A) is a plan view, whereas (B) is a sectional view taken along the line B-B of (A)
Figure 15:
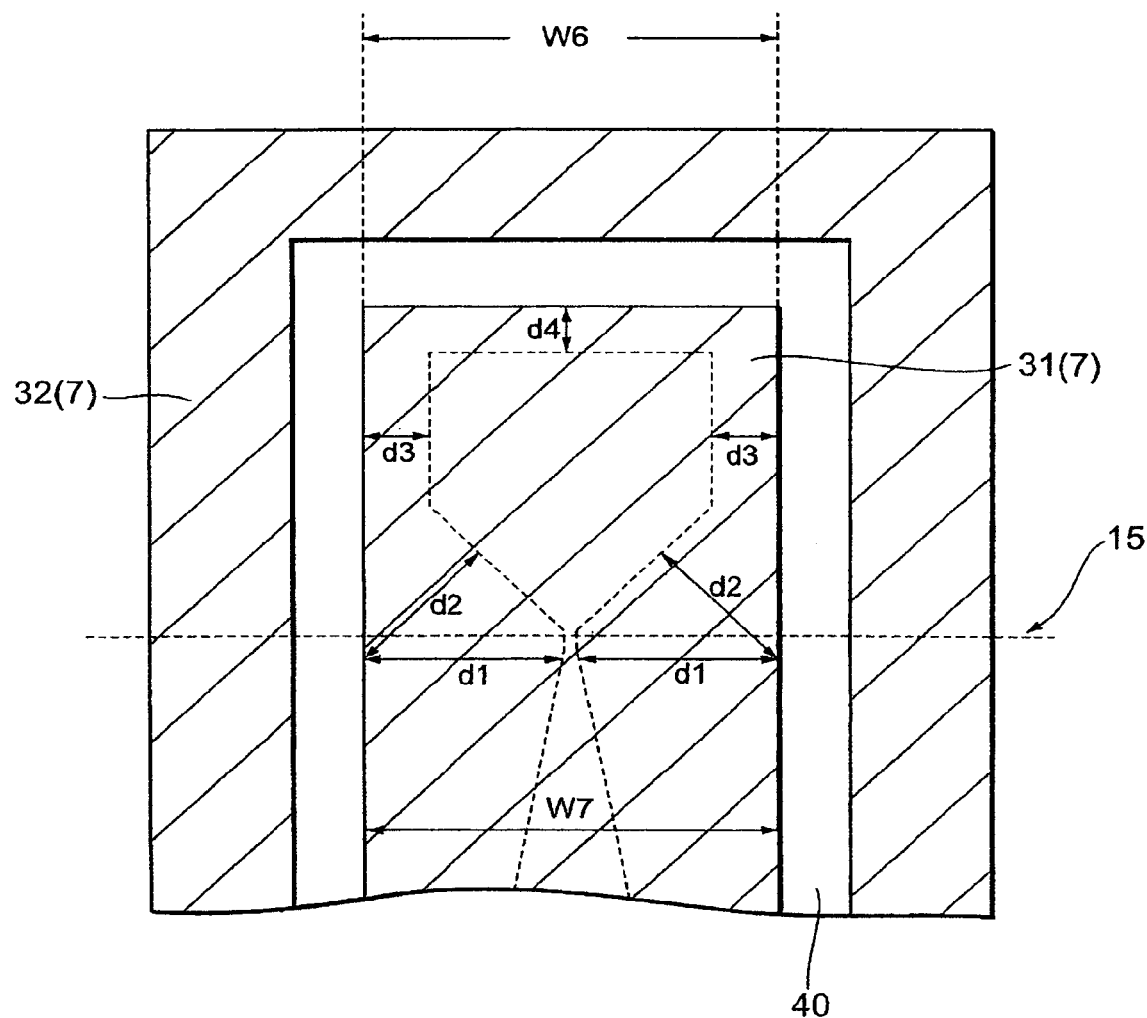
FIG. 15 is a plan view corresponding to FIG. 10 in the case of manufacturing a thin-film magnetic head by forming a separation groove having a different form.

FIG. 1 is a sectional view of the thin-film magnetic head 300 taken along a direction intersecting the thin-film coil. FIGS. 2 to 9 are sectional views assuming states where the thin-film magnetic head 300 is cut at the ABS 15 during the course of its manufacture. FIG. 10 is a plan view corresponding to FIG. 4 during the course of manufacturing the thin-film magnetic head 300, whereas FIG. 11 is a plan view similarly corresponding to FIG. 5. FIG. 12 is a view showing the insulating layer corresponding to FIG. 2, in which (A) is a plan view, whereas (B) is a sectional view taken along the line B-B of (A). FIG. 13 is a view enlarging a main part of FIG. 12 with changed ratios of dimensions, in which (A) is a plan view, (B) is a sectional view assuming a state cut at the ABS 15 in (A), and (C) is a sectional view enlarging a main part in (B).

Next, a coating 2 made of Ta or Ru is formed on the insulating layer 1 by a thickness of 200 to 1000 Å. (The coating 2 may be formed from not only Ta and Ru, but also W, Ti, Cr, NiCr, and the like.) Further, after a photoresist is applied onto the whole surface, patterning is performed with a predetermined photomask, so as to form a resist pattern 3 exposing the surface of the insulating layer 1 into a form corresponding to a cavity 20 which will be explained later. Then, using the resist pattern 3 as a mask, IBE or reactive ion etching (hereinafter referred to as "RIE") is performed, so as to remove the part of coating 2 not covered with the resist pattern 3, and the part of insulating layer 1 not covered with the resist pattern 3. This forms the cavity 20 in the insulating layer 1 shown in FIGS. 12 and 13. In this case, RIE is performed alone when the coating 2 is made of Ta. When the coating 2 is made of Ru, the coating 2 and the insulating layer 1 are removed by IBE and RIE, respectively. When performing RIE, the part of cavity 20 corresponding to the magnetic pole end part 11 is formed into a taper having a bevel angle of about 7 to 10 degrees while using a mixed gas of $Cl_2$, $BCl_3$, and $CF_4$. Thus forming the cavity 20 allows the insulating layer 1 to become a base insulating layer in the present invention.

The cavity 20 is a magnetic pole forming depression in the present invention, which is made by partly depressing the insulating layer 1 into a form corresponding to the outer form of the main magnetic layer 10 in order to make the main magnetic layer 10 with set dimensions and shape (the hatched part in (A) of FIGS. 12 and 13 indicating the cavity 20) as shown in FIGS. 12 and 13. Namely, as will be explained later in detail, the cavity 20 is formed prior to the main magnetic pole layer 10, so as to have a depth d1 (about 0.25 to 0.35 μm, preferably 0.3 μm), dimensions including width and length, and a shape which coincide with the assumed thickness, width, and length of the main magnetic layer 10.

The cavity 20 includes a very narrow groove 23 formed so as to define the track width of the thin-film magnetic head 300; a variable width depression 24, connected to the very narrow groove 23, having a gradually increasing groove width; a fixed width depression 25, connected to the variable width depression 24, having a fixed groove width; and a protruded depression 26 connected to the end part of the narrow groove part 23 opposite from the variable width depression 24. A remnant magnetic layer 31, which will be explained later, filling the cavity 20 forms the main magnetic layer 10.

Figure 3:
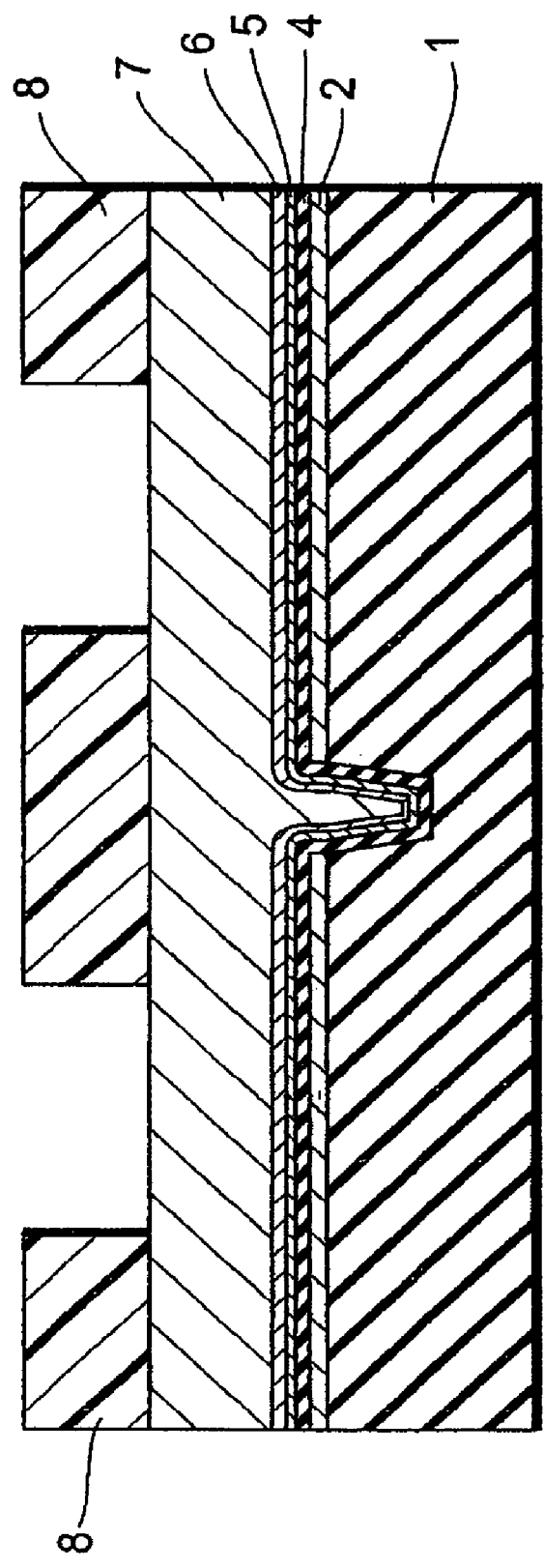
FIG. 3 is a sectional view showing a step subsequent to FIG. 2.

Next, as shown in FIG. 3, a CVD film 4 made of alumina ($Al_2O_3$) is formed by an atomic layer method so as to enter the cavity 20 in order to adjust the track width. (A conductive film made of Ta, Ru, W, TiW, TiN, or the like may be formed instead of the CVD film 4 by the atomic layer method as well.) The thickness of the CVD film 4 or conductive film corresponds to the track width and is usually about 200 to 500 Å. On the upper side of the CVD film 4 or conductive film, a stopper 5 which will later be used as a stop film for CMP is formed from Ta or Ru (by a thickness of about 300 to 600 Å). When a conductive film of the same species as with the stopper 5 made of Ta, Ru, or the like is formed in order to adjust the track width, this conductive film substitutes for the stopper 5, thus making it unnecessary to newly form the stopper 5. In this case, the conductive film is used as a stop film. On the stopper 5, a plated seed layer 6 is formed by sputtering with CoFe (24T), CoNiFe, or NiFe. Then, the whole surface of the substrate is electrolytically plated with a magnetic material such as CoNiFe or CoFe, so as to form a plated magnetic layer 7 having a thickness of about 0.5 to 1.2 μm. The electrolytic plating over the whole surface can accurately control the composition of the plated magnetic layer 7 to a leading end part within the cavity 20.

Subsequently, after a photoresist is applied to the whole upper face of the plated magnetic layer 7, patterning is performed with a predetermined photomask, so as to expose the surface of the plated magnetic layer 7 into a form corresponding to a separation groove 30, which will be explained later, as shown in FIG. 3, thereby yielding a resist pattern 8.

Figure 4:
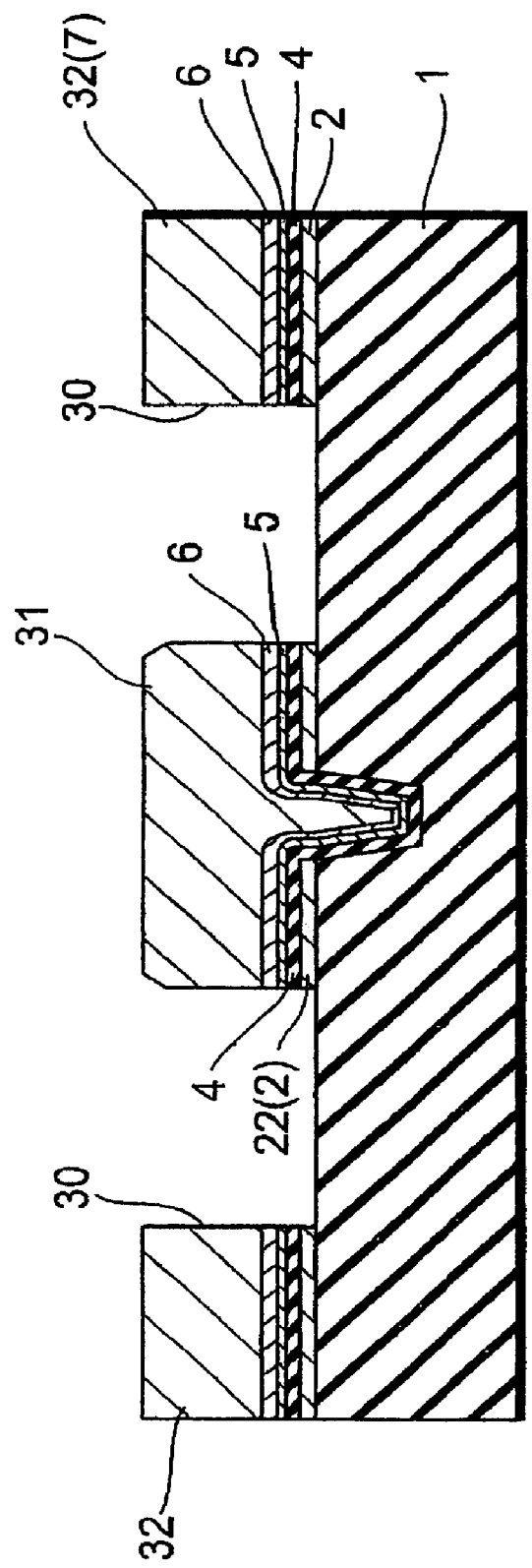
FIG. 4 is a sectional view showing a step subsequent to FIG. 3.

Next, IBE is performed while using the resist pattern 8 as a mask, so as to remove the respective parts not covered with the resist pattern 8 in the layers (coating 2, CVD film 4, stopper 5, and seed layer 6) from the plated magnetic layer 7 to the coating 2. Then, the separation groove 30 is formed as shown in FIGS. 4 and 10. The separation groove 30 is formed into a band form having a width W30 (e.g., on the order of 5 to 20 μm) so as to substantially surround the periphery of the cavity 20 along the outer form of the cavity 20 on the outside of the cavity 20. The separation groove 30 having the width W30 on the order of 5 to 20 μm can keep the stoppers 5 from increasing their intervals.

Since the separation groove 30 is formed along the outer form of the cavity 20, its part corresponding to the very narrow groove 23 has a gap W5 narrower than the gap W6 of the other parts (W5<W6). Thus forming the separation groove 30 separates the plated magnetic layer 7 into an inner part closer to the cavity 20 and a part on the outside of the cavity 20. (The hatched part of FIG. 10 indicates the plated magnetic layer 7, whereas the other part indicates the surface of insulating layer 1 exposed by the separation groove 30.) The former separated from the plated magnetic layer 7 becomes the remnant magnetic layer 31 in the present invention, whereas the latter becomes an outer magnetic layer 32 in the present invention. Since the separation groove 30 is formed by removing the layers from the plated magnetic layer 7 to the coating 2, the surface of the insulating layer 1 is exposed into a form corresponding to the shape of the separation groove 30. Since the remnant magnetic layer 31 is left, the coating 2 partly remains as a remnant coating 22 on the lower side of the remnant magnetic layer 31. The remnant coating 22 is formed in a part between the cavity 20 and separation groove 30 on the surface of the insulating layer 1. While the remnant magnetic layer 31 is a magnetic layer required for forming the main magnetic layer 10, the outer magnetic layer 32 is a magnetic layer which is not necessary for forming the main magnetic layer 10.

When forming the separation groove 30, it is necessary that the resist pattern 8 be formed while being positioned such that an outer peripheral distance d1 to d4 (see FIG. 10) indicating the gap between the cavity 20 and separation groove 30 is secured by a necessary and sufficient amount. The shorter the outer peripheral distance d1 to d4 is, the smaller the area of the remnant magnetic layer 31 becomes. This will remove the remnant magnetic layer 31 faster when polished by CMP in a later step, whereby the amount removed per unit time by polishing (hereinafter referred to as "polishing speed") may become too higher in the remnant magnetic layer 31 than in the whole plated magnetic layer 7.

For example, the polishing speed in the remnant magnetic layer 31 becomes too fast in this case, so that the stopper 5 is exposed earlier as shown in FIGS. 14(A),(B). Since the outer magnetic layer 32 still remains, however, the remnant magnetic layer 31 may disappear upon further polishing before the outer magnetic layer 32 is completely removed. Therefore, the polishing by CMP may advance too much in the remnant magnetic layer 31, thereby making it easier for the cavity 20 to increase its sinking. Consequently, the height of magnetic pole end part 11 cannot be adjusted favorably within the wafer, thus yielding places where the track width is not uniform. When the outer peripheral distance d1 to d4 is too long, by contrast, the remnant magnetic layer 31 becomes greater, so as to retard the polishing by CMP, thereby leaving an unpolished part, thus generating fluctuations in the amount of polishing. The amount of polishing is harder to adjust in this case as well. Consequently, for forming the magnetic pole end part 11 with a uniform size without fluctuations, the outer peripheral distance d1 to d4 is needed to be adjusted within an appropriate range.

In view of this point, the outer peripheral distance d1 to d4 is set within the range of about 40 to 50 μm. It has been verified that there are no problems in practice even when the outer peripheral distance d1 to d4 is about 200 μm or about 15 μm. However, the upper limit seems to be about 1000 μm, since the polishing speed is harder to adjust when the outer peripheral distance d1 to d4 exceeds about 1000 μm. The lower limit seems to be about 10 μm, since the stopper 5 may be exposed earlier when the outer peripheral distance d1 to d4 is shorter than about 10 μm. From these points, it will be preferred if the outer peripheral distance d1 to d4 is set within the range of about 10 μm to about 1000 μm. In this range, the outer peripheral distance d1 to d4 is preferably set within the range of about 15 μm to about 200 μm in particular, more preferably within the range of about 40 μm to about 50 μm. When the outer peripheral distance d1 to d4 is set at least within the range of about 10 μm to about 1000 μm, the remnant magnetic layer 31 having such a size as to be able to form the main magnetic layer 10 with a uniform size without fluctuations is obtained.

Figure 5:
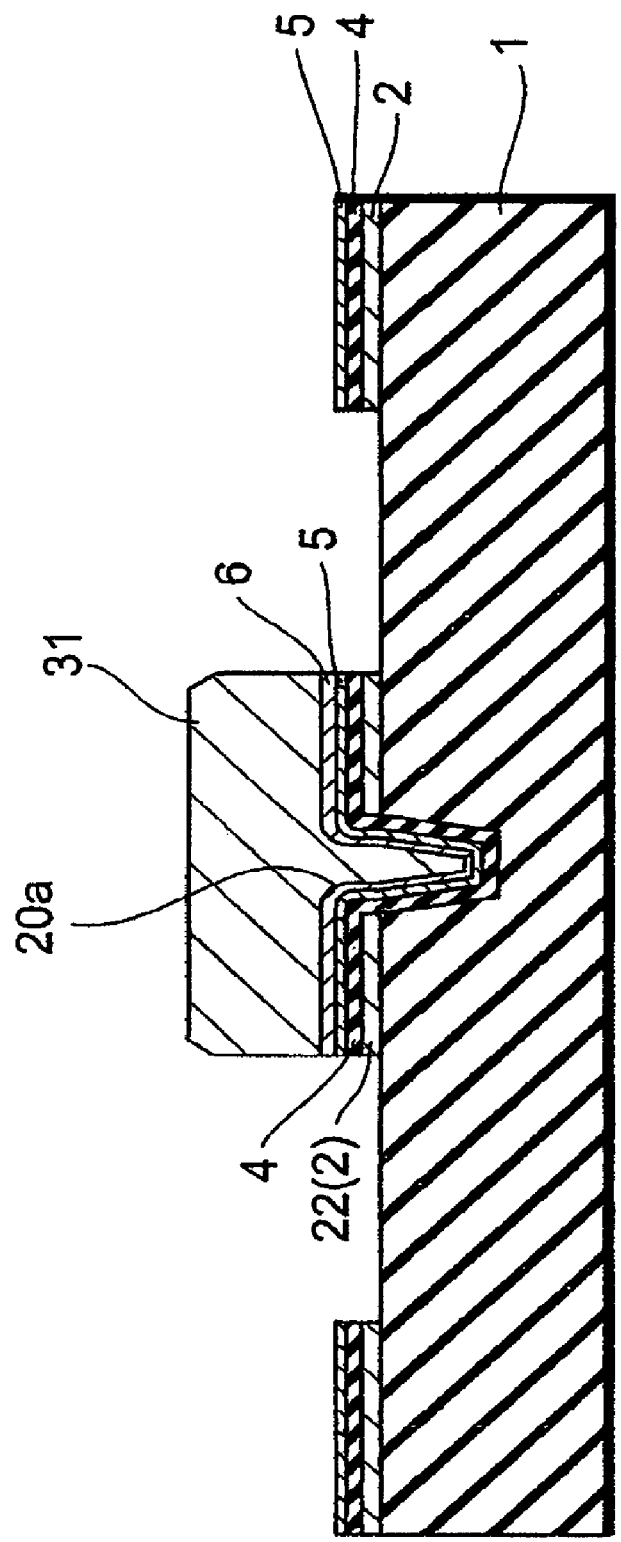
FIG. 5 is a sectional view showing a step subsequent to FIG. 4.

After thus separating the plated magnetic layer 7 into the remnant magnetic layer 31 and outer magnetic layer 32 by forming the separation groove 30, wet etching with nitric acid is performed before forming the main magnetic pole layer 10 by polishing with CMP, so as remove the outer magnetic layer 32, which is not required for forming the main magnetic pole layer 10, together with the seed layer 6 thereunder. This removes the outer magnetic pole layer 32, thereby leaving the remnant magnetic layer 31 and stopper 5 as shown in FIGS. 5 and 11. When the outer magnetic layer 32 is removed, the magnetic layer to be subjected to CMP is only the remnant magnetic layer 31, which is smaller, whereby the polishing speed of CMP increases, which makes it possible to adjust the amount of polishing accurately. The outer magnetic layer 32, which is not required for forming the main magnetic pole layer 10, greatly affects the polishing speed of CMP. Removing such an outer magnetic layer 32 before CMP stabilizes the polishing speed of CMP.

Though a manufacturing method leaving the outer magnetic layer 32 may be employed as will be explained later, the polishing speed of CMP becomes slower, since the magnetic layer to be subjected to CMP is greater. This makes it harder to adjust the amount of polishing accurately, so that an unpolished part may occur, thereby unevenly polishing the surroundings of the cavity 20. Therefore, it is desirable that the outer magnetic layer 32 be removed by wet etching or the like before polishing by CMP.

Figure 6:
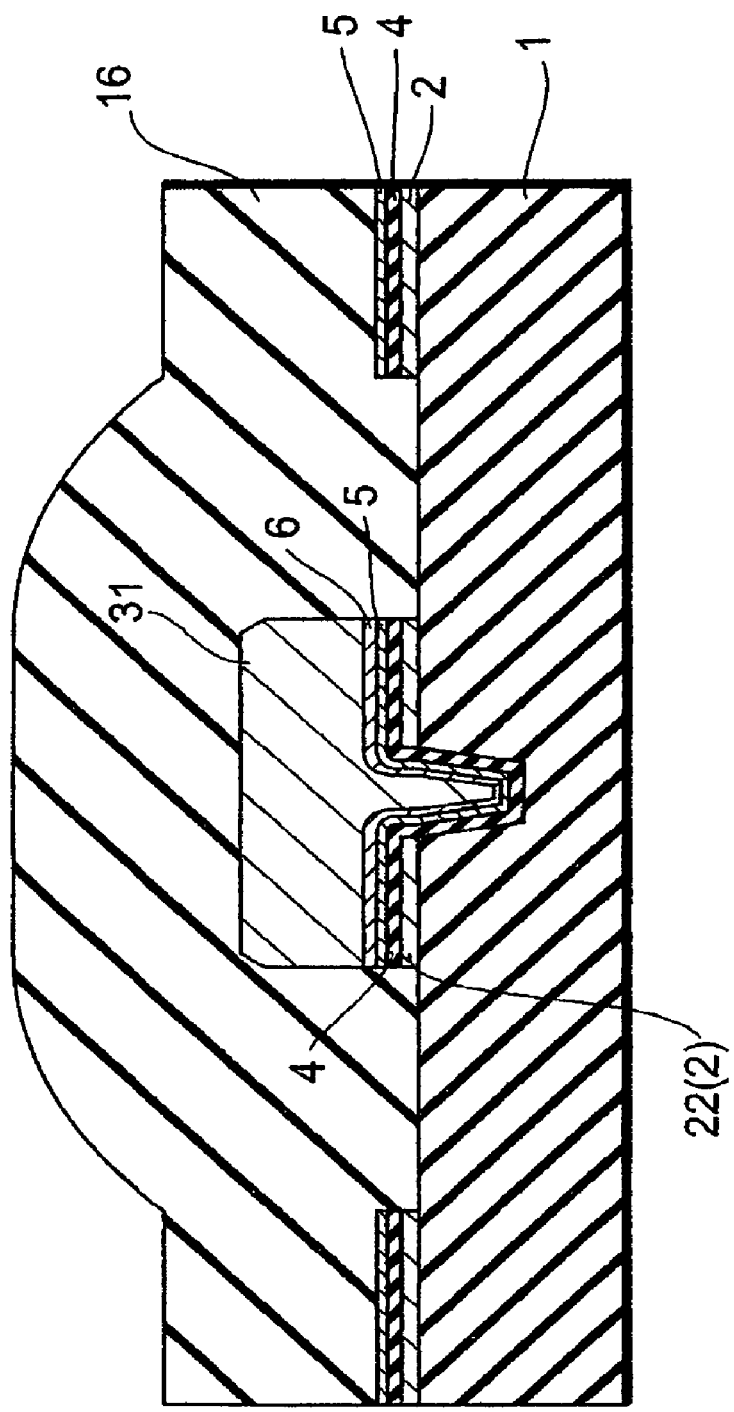
FIG. 6 is a sectional view showing a step subsequent to FIG. 5.
Figure 7:
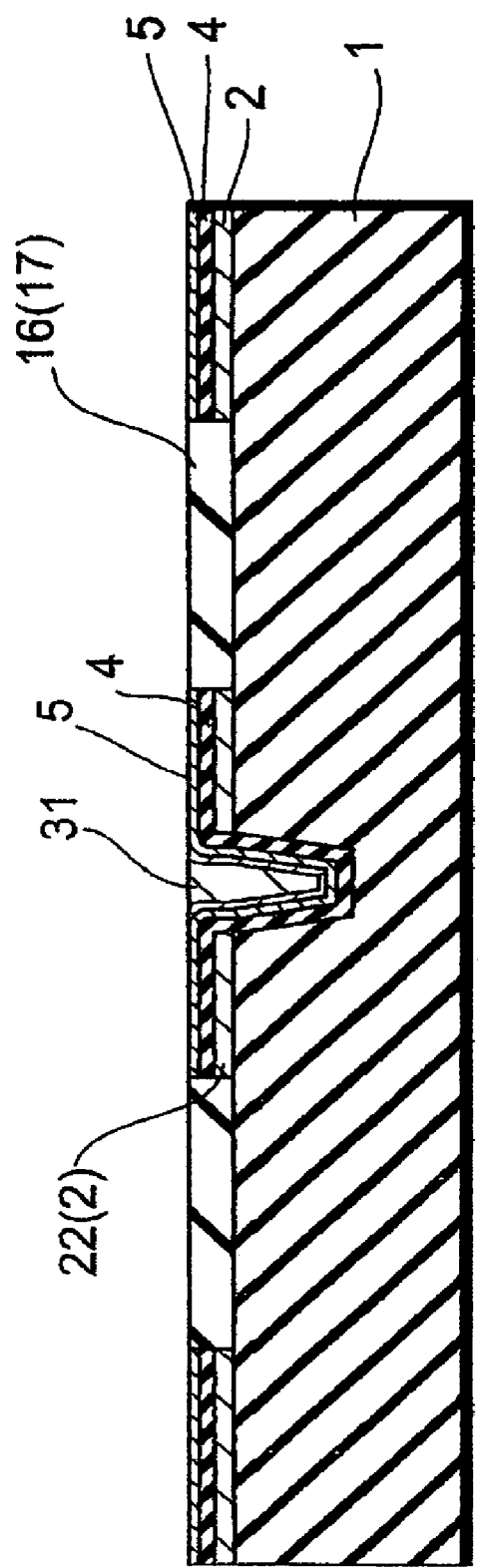
FIG. 7 is a sectional view showing a step subsequent to FIG. 6.

On the plated magnetic layer 7 (remnant magnetic layer 31 and outer magnetic pole 32) separated by the separation groove 30, a cover insulating film 16 made of alumina adapted to cover the whole upper face is formed by a thickness of about 0.5 to 1.2 μm, whereby the state shown in FIG. 6 is attained. Then, the whole substrate surface is polished by CMP until the stopper 5 is exposed, so as to remove the part of remnant magnetic layer 31 on the outside of the cavity 20 together with the seed layer 6 thereunder, thereby yielding the state shown in FIG. 7.

Figure 8:
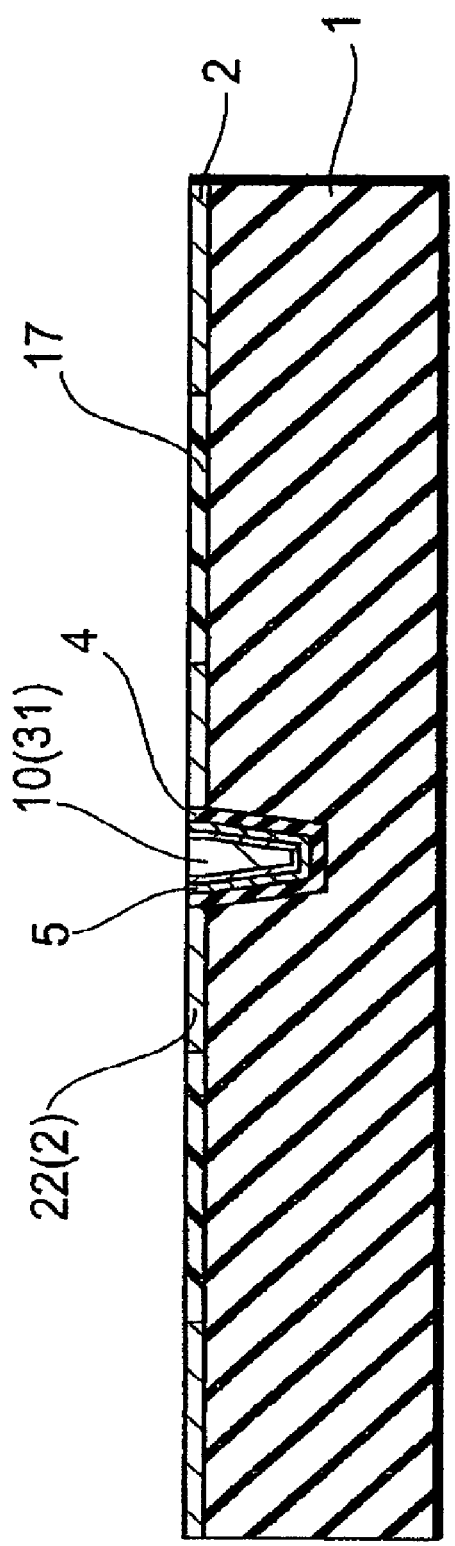
FIG. 8 is a sectional view showing a step subsequent to FIG. 7.

Thereafter, fine adjustment is effected by IBE, and the stopper 5 is removed, whereby the part of remnant magnetic layer 31 left on the inside of the cavity 20 forms the main magnetic pole layer 10, thus yielding the state shown in FIG. 8. Here, the cover insulating film 16 partly remains on the inside of the separation groove 30. The part of cover insulating film 16 left on the inside of the separation groove 30 becomes a remnant insulating film 17 in the present invention. Since the whole substrate surface is polished by CMP until the stopper 5 is exposed, the surface of the remnant insulating film 17 and the surface of the main magnetic pole layer 10 are formed flat without a step. Since the cavity 20 is formed in conformity to dimensions assumed beforehand, thus formed main magnetic pole layer 10 has accurate dimensions.

As mentioned above, the separation groove 30 is formed, so as to separate the plated magnetic layer 7 into the remnant magnetic layer 31 and outer magnetic layer 32, the outer magnetic layer 32 not required for forming the main magnetic layer 10 is removed, and then the whole substrate surface is polished by CMP, so as to form the main magnetic pole layer 10. Removing the outer magnetic layer 32 beforehand decreases the magnetic layer to be subjected to CMP, thereby making it possible to accurately adjust the amount of polishing by CMP. Since the outer peripheral distance is defined as mentioned above when forming the separation groove 30, the remnant magnetic layer 31 is formed by a size falling within a range which does not hamper dimensional uniformity in the main magnetic pole layer 10. These prevent the polishing speed of CMP from fluctuating. This keeps the remnant magnetic layer 31 from being polished too much by CMP and from leaving an unpolished part because of shortage in polishing on the contrary, whereby the height of the main magnetic pole layer 10 can be adjusted accurately. Therefore, the magnetic pole end part 11 can attain an accurate, uniform track width without fluctuations, whereby the main magnetic pole layer 10 is formed with a uniform size without fluctuations.

Figure 9:
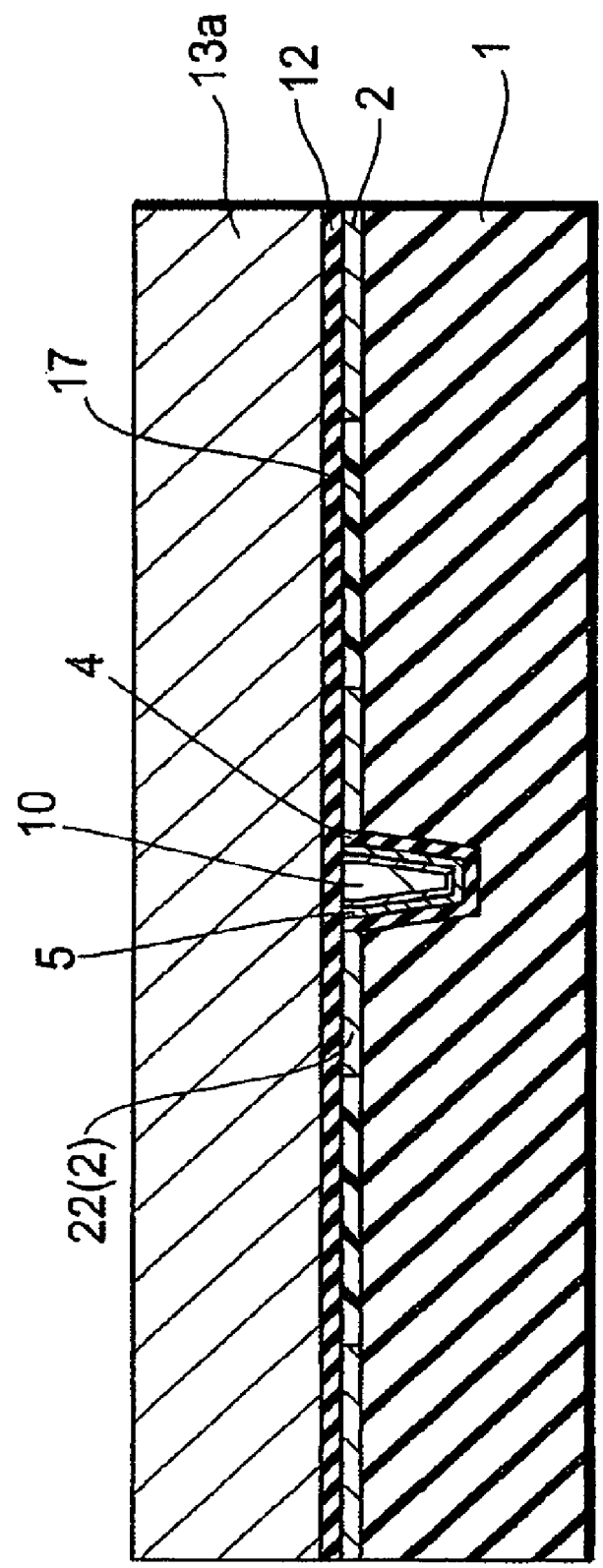
FIG. 9 is a sectional view showing a step subsequent to FIG. 8.

Subsequently, a recording gap layer 12 is formed on the main magnetic pole layer 10 as shown in FIG. 9, and an upper magnetic pole layer 14 is formed together with a shield part 13a by using CoNiFe or CoFe as a magnetic material so as to overlie the main magnetic pole layer 10 as shown in FIG. 1. Then, the part of thin-film coil 100 on the upper side of the main magnetic pole layer 10 is formed, and a shield part 13b is formed by using CoNiFe or CoFe as a magnetic material, so that the shield parts 13a and 13b construct a write shield layer 13. Further, an upper insulating layer 18 is formed, whereby the thin-film magnetic head 300 shown in FIG. 1 is obtained.

Modified Example 1

Figure 16:
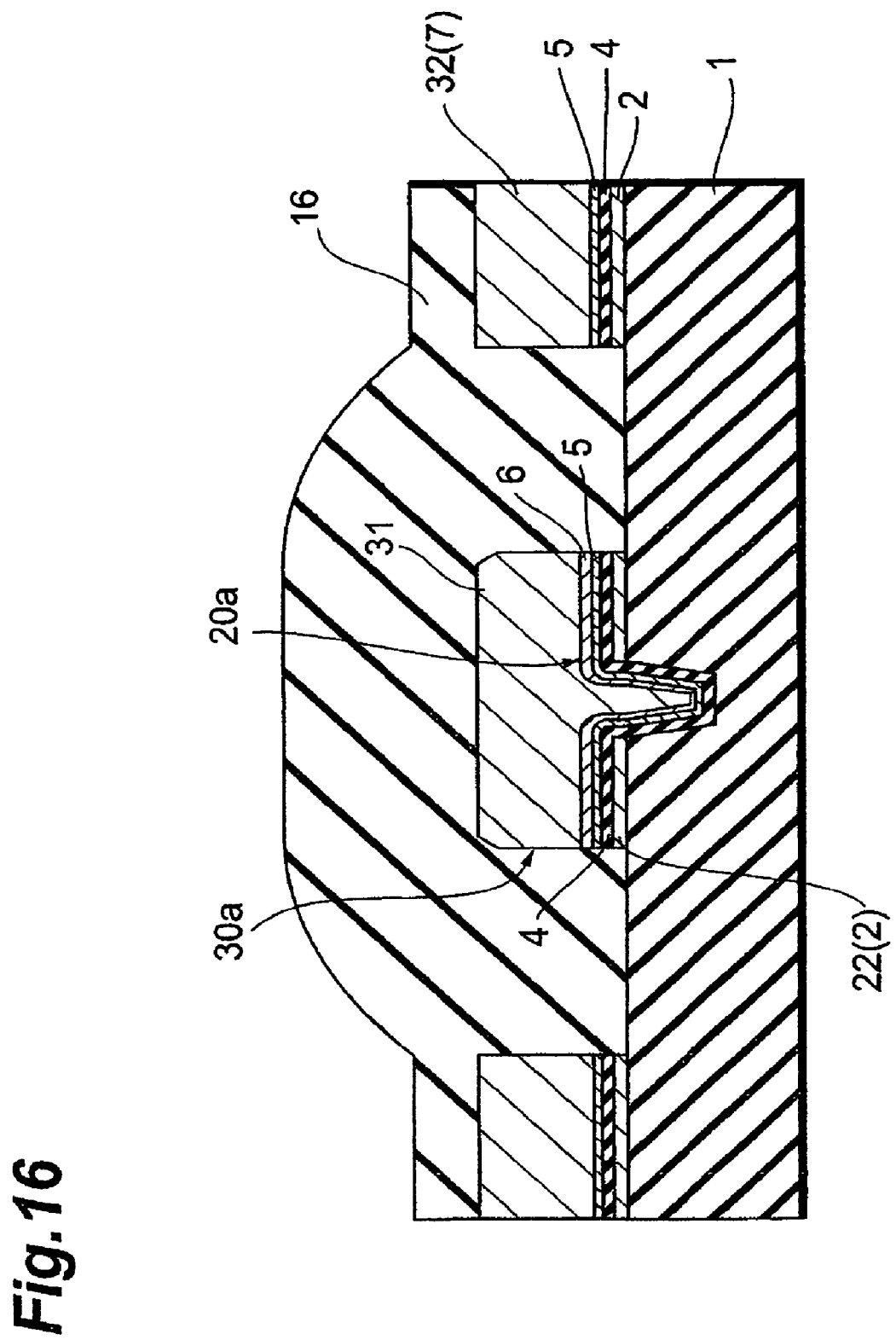
FIG. 16 is a sectional view showing a step corresponding to FIG. 6 during the course of manufacturing the thin-film magnetic head in accordance with the embodiment of the present invention by another manufacturing method.

Though the above-mentioned manufacturing method performs the step of removing the outer magnetic layer 32 not required for forming the main magnetic pole layer 10, so as to attain the state shown in FIG. 5, next after the cover insulating film 16 is formed, then polishes the whole substrate surface by CMP, the thin-film magnetic head 300 may be manufactured without performing the step of removing the outer magnetic layer 32. Namely, the step of separating the plated magnetic layer 7 by forming the separation groove 30 may be performed so as to attain the state of FIGS. 4 and 10, and then the state of FIG. 16. In FIG. 16, the cover insulating film 16 is formed on the plated magnetic layer 7 (remnant magnetic layer 31 and outer magnetic pole 32) separated by the separation groove 30 while keeping the outer magnetic layer 32 from being removed. It will be sufficient if the whole substrate surface is polished by CMP thereafter. The plated magnetic layer 7 is separated into the remnant magnetic layer 31 and outer magnetic pole 32 by forming the separation groove 30 in this case as in the above-mentioned manufacturing method. Therefore, when the whole substrate surface is polished by CMP, the polishing by CMP advances from both of the end part 20a of the cavity 20 and the end part 30a of the separation groove 30, so that the rate at which the plated magnetic layer 7 is removed by polishing of CMP becomes stable, which makes it less likely for the remnant magnetic layer 31 to be polished too much by CMP or leave an unpolished part due to the shortage in polishing. Therefore, this manufacturing method can also accurately adjust the height of the magnetic pole end parts 11, so that the magnetic pole end part 11 can attain an accurate, uniform track width without fluctuations.

Modified Example 2

Since the above-mentioned separation groove 30 is formed in conformity to the outer shape of the cavity 20, the gap W5 of the part of cavity 20 corresponding to the very narrow groove 23 is narrower than the gap W6 of the other parts. Instead of being formed as such, the separation groove may be formed as a separation groove 40 shaped such that the gap of its part corresponding to the very narrow groove 23 has a gap W7 substantially equal to the gap W6. When the plated magnetic layer 7 is separated by forming the separation groove 40, the part of remnant magnetic layer 31 arranged near the very narrow groove 23 becomes greater than that in the case where the separation groove 30 is formed. This is effective in that the part to become the magnetic pole end part 11 can be protected when polishing the plated magnetic layer 7 by CMP.

Characteristics of the Structure of the Thin-Film Magnetic Head 300

The thin-film magnetic head 300 is manufactured by the foregoing manufacturing method and thus has the following characteristics. Namely, since the foregoing manufacturing method forms the main magnetic pole layer 10 by the part of remnant magnetic layer 31 left on the inside of the cavity 20, the main magnetic pole layer 10 is formed with accurate dimensions in the thin-film magnetic head 300. Also, the plated magnetic layer 7 is separated into the remnant magnetic layer 31 and outer magnetic layer 32, the cover insulating film 16 is formed after removing the outer magnetic layer 32 or while keeping the outer magnetic layer 32, and then the whole substrate surface is polished by CMP, so as to form the main magnetic pole layer 10. Therefore, the magnetic pole end part 11 has an accurate, uniform track width without fluctuations, whereby the main magnetic pole layer 10 is formed with a uniform size without generating fluctuations.

The thin-film magnetic head 300 is formed by way of such a step that the separation groove 30 is formed so as to expose the surface of the insulating layer 1 and then the cover insulating film 16 is formed, whereby the cover insulating film 16 partly enters the separation groove 30. Consequently, the thin-film magnetic head 300 has the above-mentioned remnant insulating film 17. The remnant insulating film 17 is formed at a place where the separation groove 30 was formed in a step during the course of manufacture, and thus is arranged at a position on the outside of the cavity 20 with an outer peripheral distance therefrom as with the separation groove 30 so as to surround the cavity 20 along the outer shape thereof. The width of the remnant insulating film 17 is the same as the width W30 of the separation groove 30.

The thin-film magnetic head 300 is formed by way of such a step as to keep the remnant magnetic layer 31. Therefore, the thin-film magnetic head 300 also has the above-mentioned remnant coating 22. Since the main magnetic pole layer 10 is formed by way of a step of polishing the whole substrate surface by CMP, the surface of the remnant insulating film 17 and the surface of the main magnetic pole layer 10 are formed flat without a step. A recording gap layer 24 is formed on thus formed main magnetic pole layer 10, the remnant insulating film 17, and the remnant coating 22.

Embodiments of Head Gimbal Assembly and Hard Disk Drive

Embodiments of head gimbal assembly and hard disk drive will now be explained.

Figure 17:
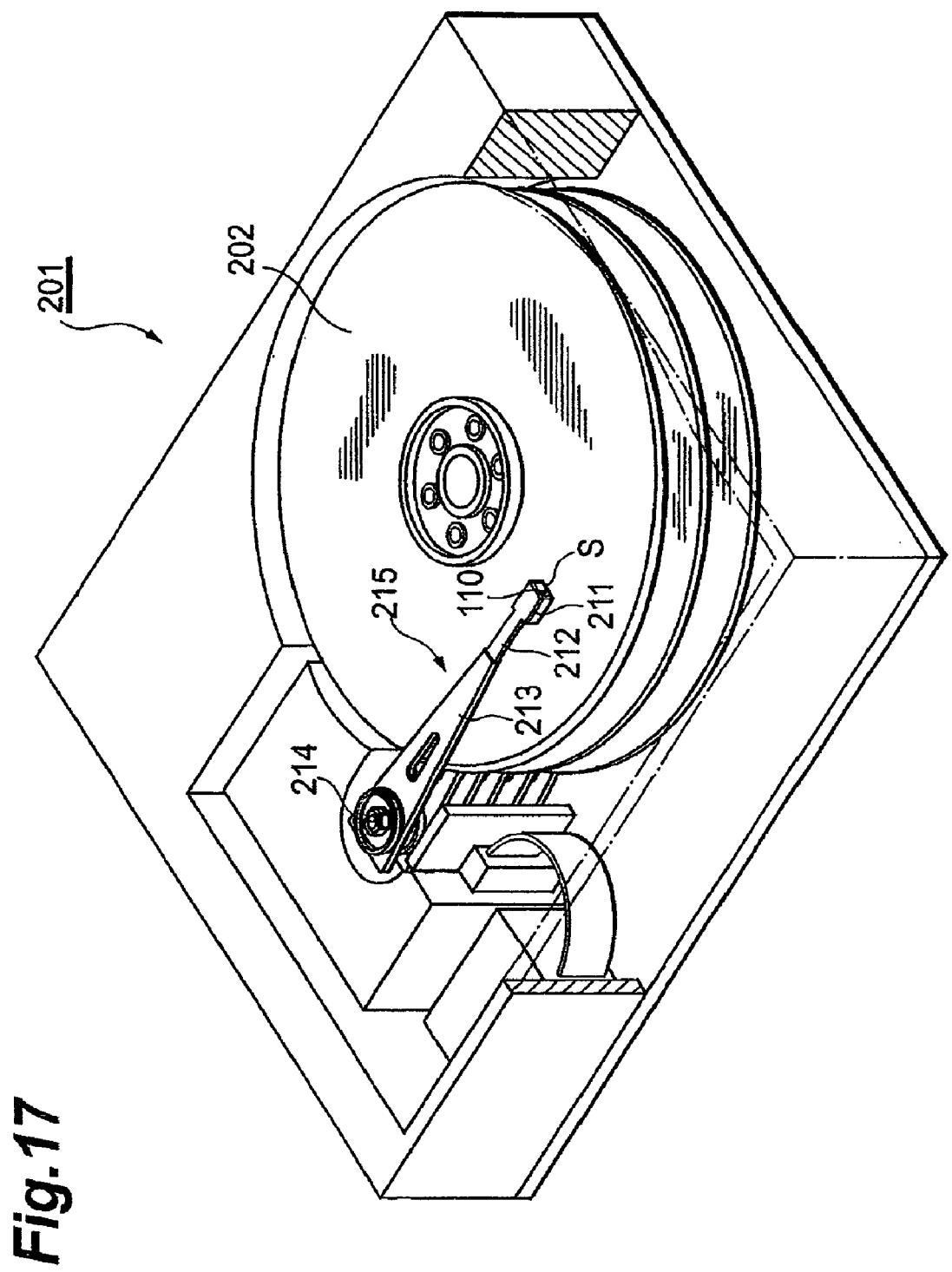
FIG. 17 is a perspective view showing a hard disk drive equipped with the thin-film magnetic head in accordance with the embodiment of the present invention.
Figure 18:
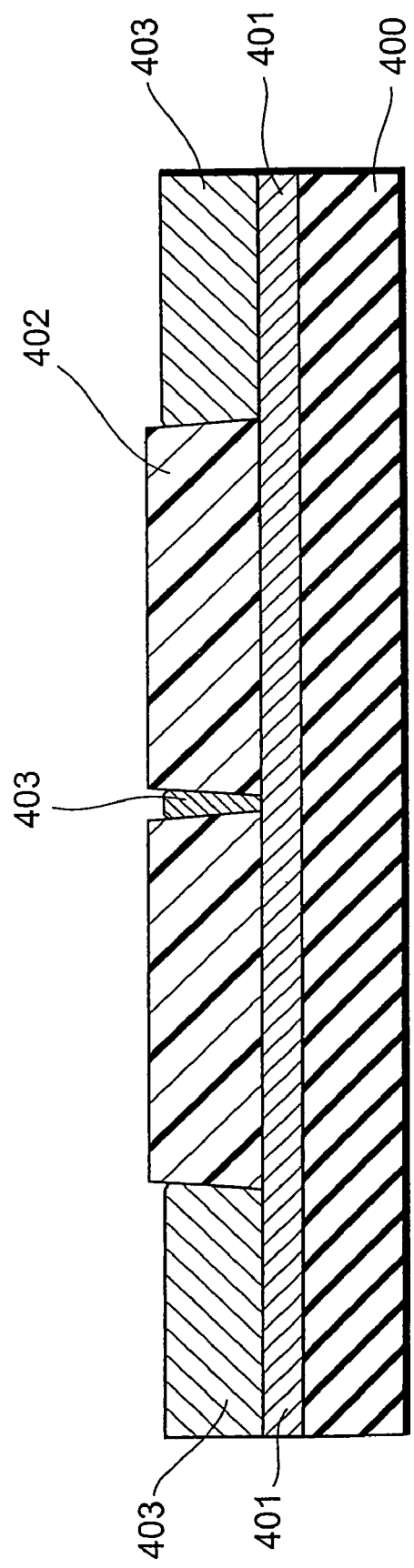
FIG. 18 is a sectional view assuming a state where a thin-film magnetic head is cut at the ABS during the course of its manufacture by a conventional manufacturing method.
Figure 19:
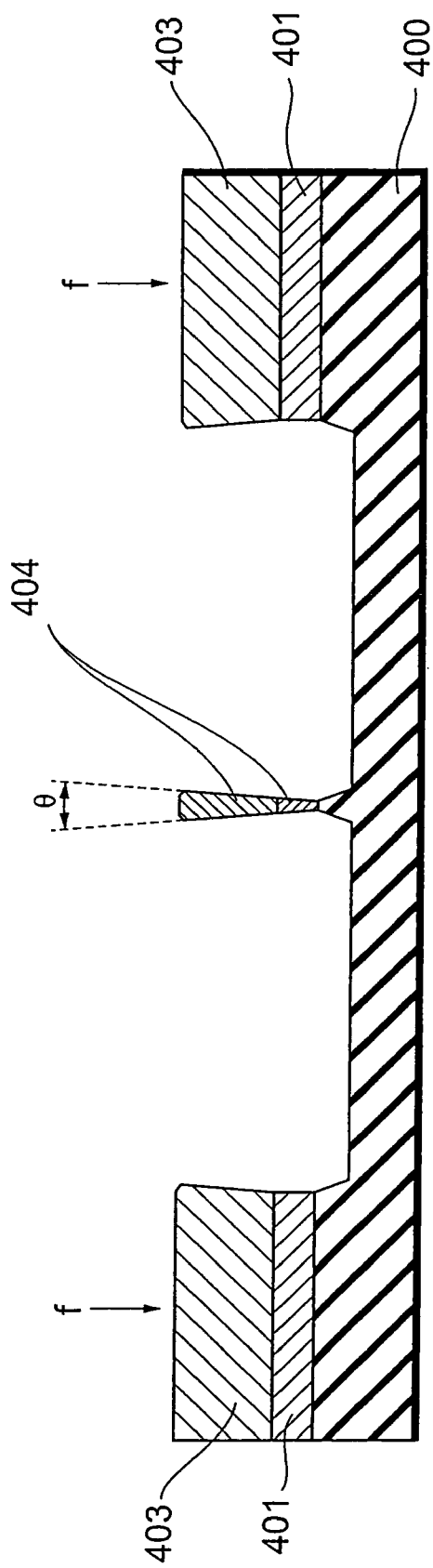
FIG. 19 is a sectional view showing a step subsequent to FIG. 18.
Figure 20:
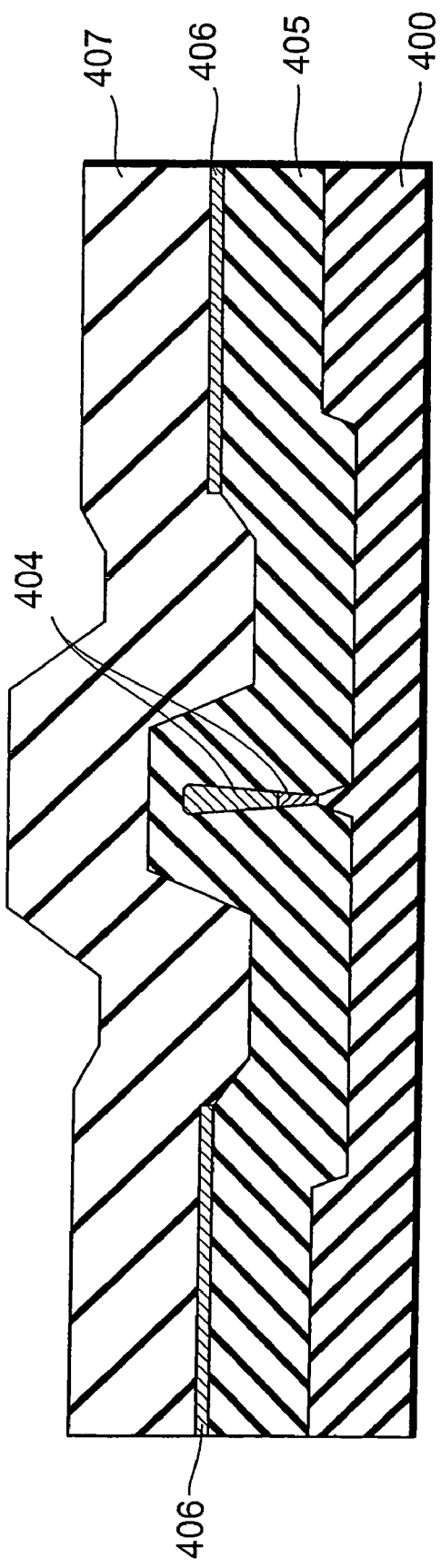
FIG. 20 is a sectional view showing a procedure of making a magnetic pole end part attain a uniform height while assuming the state of being cut at the ABS.
Figure 21:
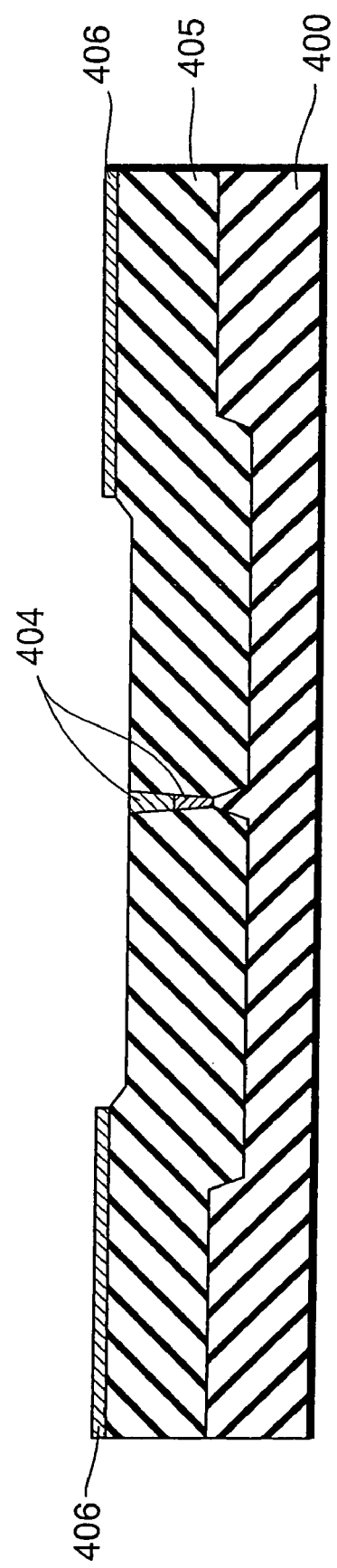
FIG. 21 is a sectional view showing a state subsequent to FIG. 20.

FIG. 17 is a perspective view showing a hard disk drive 201 equipped with the above-mentioned thin-film magnetic head 300. The hard disk drive 201 includes a hard disk (recording medium) 202 rotating at a high speed and a head gimbal assembly (HGA) 215. The hard disk drive 201 is an apparatus which actuates the HGA 215, so as to record/reproduce magnetic information onto/from recording surfaces of the hard disk 202. The hard disk 202 has a plurality of (3 in the drawing) platters. Each platter has a recording surface opposing the thin-film magnetic head 300. In the HGA 215, a gimbal 212 mounted with a head slider 211 having a support formed with the thin-film magnetic head 300, and a suspension arm 213 supporting the gimbal 212 are arranged at each of the recording surfaces of the platters, while being rotatable about a shaft 214 by a voice coil motor which is not depicted, for example. When the HGA 215 is rotated, the head slider 211 moves radially of the hard disk 202, i.e., in directions across track lines.

Each of such HGA 215 and hard disk drive 201 has a thin-film magnetic head 300, whereby the main magnetic pole layer 10 is formed with accurate dimensions, while the height of the main magnetic pole layer 10 is an accurate, uniform value.

Though the above-mentioned embodiments describe the type (type 1) in which the thin-film coil is wound about the main magnetic pole layer by way of example, the present invention is also employable in thin-film magnetic heads of a type (type 2) in which the thin-film coil is wound about a write shield layer.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A method of manufacturing a thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated, the method comprising the steps of:

forming a base insulating layer having a magnetic pole forming depression sunken into a form corresponding to the main magnetic pole layer;

forming a stop film for CMP on the base insulating layer such that the stop film enters the magnetic pole forming depression and then forming a magnetic layer on the stop film;

removing part of the magnetic layer by forming a separation groove substantially surrounding the magnetic pole forming depression on an outside of the magnetic pole forming depression;

forming a cover insulating film adapted to cover the whole upper face of the magnetic layer separated by the separation groove;

polishing a surface by CMP until the stop film is exposed, so that a part of the magnetic layer remaining on an inside of the magnetic pole forming depression is used as the main magnetic pole layer; and forming the recording gap layer, write shield layer, and thin-film coil.

2. The method of manufacturing a thin-film magnetic head according to claim 1, wherein, when the part of magnetic layer remaining on the inside of the magnetic pole forming depression is used as the main magnetic pole layer, a part of the cover insulating film remaining on the inside of the separation groove is used as a remnant insulating film.

3. The method of manufacturing a thin-film magnetic head according to claim 1, wherein, when the part of magnetic layer remaining on the inside of the magnetic pole forming depression is used as the main magnetic pole layer, a height of the main magnetic pole layer is finely adjusted by IBE, so as to remove the stop film.

4. The method of manufacturing a thin-film magnetic head according to claim 1, wherein the separation groove is formed such that an outer peripheral distance indicating a gap between the magnetic pole forming depression and the separation groove is set within the range of 10 to 1000 μm.

5. The method of manufacturing a thin-film magnetic head according to claim 1, wherein the separation groove is formed such that an outer peripheral distance indicating a gap between the magnetic pole forming depression and the separation groove is set within the range of 15 to 200 μm.

6. A method of manufacturing a thin-film magnetic head having a structure in which a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated, the method comprising the steps of:

forming a base insulating layer having a magnetic pole forming depression sunken into a form corresponding to the main magnetic pole layer;

forming a stop film for CMP on the base insulating layer such that the stop film enters the magnetic pole forming depression and then forming a magnetic layer on the stop film;

forming a separation groove substantially surrounding the magnetic pole forming depression on an outside of the magnetic pole forming depression, so that, of part of the magnetic layer removed by the forming of the separation groove, a part on the inside of the separation groove is used as a remnant magnetic layer while a part on the outside of the separation groove is used as an outer magnetic layer;

removing the outer magnetic layer, so as to leave the remnant magnetic layer;

forming a cover insulating film adapted to cover the whole upper face including the remnant magnetic layer and separation groove;

polishing a surface by CMP until the stop film is exposed, so that a part of the magnetic layer remaining on an inside of the magnetic pole forming depression is used as the main magnetic pole layer; and forming the recording gap layer, write shield layer, and thin-film coil.

7. The method of manufacturing a thin-film magnetic head according to claim 6, wherein, when the part of remnant magnetic layer remaining on the inside of the magnetic pole forming depression is used as the main magnetic pole layer, a part of the cover insulating film remaining on the inside of the separation groove is used as a remnant insulating film.

8. The method of manufacturing a thin-film magnetic head according to claim 6, wherein, when the part of remnant magnetic layer remaining on the inside of the magnetic pole forming depression is used as the main magnetic pole layer, a height of the main magnetic pole layer is finely adjusted by IBE, so as to remove the stop film.

9. The method of manufacturing a thin-film magnetic head according to claim 6, wherein, in the step of removing the outer magnetic layer, so as to leave the remnant magnetic layer, the stop film is left.

10. The method of manufacturing a thin-film magnetic head according to claim 6, wherein the separation groove is formed such that an outer peripheral distance indicating a gap between the magnetic pole forming depression and the separation groove is set within the range of 10 to 1000 μm.

11. The method of manufacturing a thin-film magnetic head according to claim 6, wherein the separation groove is formed such that an outer peripheral distance indicating a gap between the magnetic pole forming depression and the separation groove is set within the range of 15 to 200 μm.

12. The method of manufacturing a thin-film magnetic head according to claim 6, wherein the separation groove is formed such that a width of the separation groove falls within the range of 5 to 20 μm.

* * * * *